US008097110B2

(12) United States Patent
Schiebout

(10) Patent No.: US 8,097,110 B2
(45) Date of Patent: Jan. 17, 2012

(54) ISLAND PLACEMENT TECHNOLOGY

(75) Inventor: David Schiebout, Brainerd, MN (US)

(73) Assignee: Delta Industrial Services, Inc., Minneapolis, MN (US)

( * ) Notice: Subject to any disclaimer, the term of this patent is extended or adjusted under 35 U.S.C. 154(b) by 615 days.

(21) Appl. No.: 11/857,103

(22) Filed: Sep. 18, 2007

(65) Prior Publication Data

US 2008/0066853 A1 Mar. 20, 2008

Related U.S. Application Data

(63) Continuation-in-part of application No. 11/172,281, filed on Jun. 30, 2005, now Pat. No. 7,293,593.

(60) Provisional application No. 60/584,276, filed on Jun. 30, 2004.

(51) Int. Cl.
*B32B 38/04* (2006.01)

(52) U.S. Cl. ........ 156/265; 156/297; 156/519; 156/517; 156/256

(58) Field of Classification Search .................. 156/519, 156/265, 297, 299, 517, 256
See application file for complete search history.

(56) References Cited

U.S. PATENT DOCUMENTS

| | | | |
|---|---|---|---|
| 2,291,841 | A | 8/1942 | Staude |
| 2,958,437 | A | 11/1960 | Mengis |
| 3,012,481 | A | 12/1961 | Hughes |
| 3,616,027 | A | 10/1971 | Honsel |
| 3,728,191 | A | 4/1973 | Wierzba et al. |
| 3,850,724 | A | 11/1974 | Lehmacher et al. |
| 3,879,246 | A | 4/1975 | Walker |
| 3,933,564 | A | 1/1976 | Jensen |
| 3,960,646 | A | 6/1976 | Wiedamann |
| 4,001,072 | A | 1/1977 | deNeui |
| 4,061,527 | A | 12/1977 | Traise et al. |
| 4,217,164 | A | 8/1980 | La Mers |
| 4,332,635 | A | 6/1982 | Holbrook et al. |
| 4,475,969 | A | 10/1984 | Reed |
| 4,488,922 | A | 12/1984 | Instance |
| 4,533,586 | A | 8/1985 | Roule et al. |
| 4,642,085 | A | 2/1987 | Helm |
| 4,650,537 | A | 3/1987 | Perecman |
| 4,701,239 | A | 10/1987 | Craig |
| 4,726,865 | A | 2/1988 | Treat |
| 4,765,118 | A | 8/1988 | Akutsu et al. |
| 4,795,510 | A | 1/1989 | Wittrock et al. |
| 4,980,979 | A | 1/1991 | Wedel |
| 5,031,338 | A | 7/1991 | Wedel |

(Continued)

OTHER PUBLICATIONS

" U.S. Appl. No. 11/172,281, Response filed Oct. 18, 2006 to Advisory Action mailed Sep. 25, 2006", 12 pgs.

(Continued)

*Primary Examiner* — Yogendra Gupta
*Assistant Examiner* — Ninh Le
(74) *Attorney, Agent, or Firm* — Schwegman, Lundberg & Woessner, P.A.

(57) ABSTRACT

A placement apparatus comprising an anvil roller, a die roller communicatively associated with the anvil roller, and a bump transfer roller communicatively associated with the vacuum roll. The invention also provides a process for placing articles on a web, comprising the steps of providing a stream of articles, placing the articles on the anvil roller, moving the anvil roller, moving an output web, and periodically bringing the output web into communicative association with the anvil roller whereby the articles are transferred to the output web at a predetermined distance from each other.

10 Claims, 33 Drawing Sheets

U.S. PATENT DOCUMENTS

| | | | | |
|---|---|---|---|---|
| 5,235,515 | A | 8/1993 | Ungpiyakul et al. | |
| 5,256,239 | A | 10/1993 | Voltmer et al. | |
| 5,286,543 | A | 2/1994 | Ungpiyakul et al. | |
| 5,296,080 | A | 3/1994 | Merkatoris et al. | |
| 5,324,153 | A | 6/1994 | Chess | |
| 5,503,702 | A | 4/1996 | Filicicchia et al. | |
| 5,587,043 | A | 12/1996 | Hying et al. | |
| 5,674,345 | A | 10/1997 | Nash | |
| 5,716,478 | A | 2/1998 | Boothe et al. | |
| 5,720,223 | A | 2/1998 | Meschi | |
| 5,730,818 | A | 3/1998 | Isakson | |
| 5,746,869 | A | 5/1998 | Hayden et al. | |
| 5,759,340 | A | 6/1998 | Boothe et al. | |
| 5,766,406 | A | 6/1998 | Bohn et al. | |
| 5,776,284 | A | 7/1998 | Sykes et al. | |
| 5,795,426 | A * | 8/1998 | Jackson et al. | 156/249 |
| 5,850,771 | A | 12/1998 | Killian | |
| 5,915,613 | A | 6/1999 | Meschenmoser | |
| 6,022,443 | A | 2/2000 | Rajala et al. | |
| 6,047,642 | A | 4/2000 | Hunkeler | |
| 6,071,333 | A | 6/2000 | Breton et al. | |
| 6,092,002 | A * | 7/2000 | Kastman et al. | 700/118 |
| 6,187,128 | B1 | 2/2001 | Oosterlinck | |
| 6,319,347 | B1 | 11/2001 | Rajala et al. | |
| 6,422,986 | B1 * | 7/2002 | Claybaker et al. | 493/189 |
| 6,450,321 | B1 | 9/2002 | Blumenthal et al. | |
| 6,475,325 | B1 | 11/2002 | Parrish et al. | |
| 6,494,244 | B2 | 12/2002 | Parrish et al. | |
| 6,524,423 | B1 | 2/2003 | Hilt et al. | |
| 6,550,517 | B1 | 4/2003 | Hilt et al. | |
| 6,634,269 | B2 | 10/2003 | Eckstein et al. | |
| 6,649,010 | B2 | 11/2003 | Parrish et al. | |
| 6,705,453 | B2 | 3/2004 | Blumenthal et al. | |
| 6,722,413 | B1 | 4/2004 | Koehler et al. | |
| 6,766,843 | B2 | 7/2004 | Hilt et al. | |
| 6,814,217 | B2 | 11/2004 | Blumenthal et al. | |
| 6,893,528 | B2 | 5/2005 | Middelstadt et al. | |
| 6,915,829 | B2 | 7/2005 | Popp et al. | |
| 7,293,593 | B2 | 11/2007 | Schiebout | |
| 2001/0008064 | A1 * | 7/2001 | Todd et al. | 53/455 |
| 2001/0023228 | A1 * | 9/2001 | Leijon | 493/83 |
| 2002/0038686 | A1 | 4/2002 | Parrish et al. | |
| 2002/0079045 | A1 | 6/2002 | Parrish et al. | |
| 2004/0122391 | A1 | 6/2004 | Franklin | |
| 2005/0230056 | A1 | 10/2005 | Meyer et al. | |

OTHER PUBLICATIONS

" U.S. Appl. No. 11/172,281 Advisory Action mailed Oct. 30, 2006", 5 pgs.

" U.S. Appl. No. 11/172,281 Advisory Action mailed Sep. 25, 2006", 3 pgs.

" U.S. Appl. No. 11/172,281 Final Office Action mailed Jul. 18, 2006", 13 pgs.

" U.S. Appl. No. 11/172,281 Non-Final Office Action mailed Feb. 6, 2006", 5 pgs.

" U.S. Appl. No. 11/172,281 Notice of Allowance mailed Jul. 2, 2007", 6 pgs.

" U.S. Appl. No. 11/172,281 Response to Final Office Action filed Nov. 10, 2006", 6 pgs.

" U.S. Appl. No. 11/172,281 Response to Final Office Action filed Sep. 18, 2006", 46 pgs.

" U.S. Appl. No. 11/172,281 Response to Non-Final Office Action filed May 4, 2006", 10 pgs.

"Experience the Delta Difference", *Ad*, (Mar. 2003),1 pg.

"Flexographic Printer Module", *Delta Industrial promotional literature*, (2000),2 pgs.

"Rotary Module", *Delta Industrial promotional literature*, (2000),2 pgs.

* cited by examiner

6/33

ISLAND PLACEMENT TECHNOLOGY

CROSS-REFERENCE TO RELATED APPLICATIONS, IF ANY

This application is a continuation-in-part (CIP) of U.S. patent application Ser. No. 11/172,281 filed Jun. 30, 2005, which now U.S. Pat. No. 7,293,593 which claims the benefit under 35 U.S.C. §19(e) of U.S. Provisional Patent Application Ser. No. 60/584,276, filed Jun. 30, 2004, both of which are hereby incorporated by reference.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to automated machine systems and methods, and products or articles produced thereby. Particularly, the invention relates to converting and packaging systems, methods and packaging produced thereby. Such equipment is typically used to package products for the medical, pharmaceutical, and electronics fields. Most particularly, the invention relates to and is useful for island placement systems, subsystems and processes, and webs produced thereby. The invention may be useful in other fields.

2. Background Information

The state of the art includes various converting and packaging systems and subsystems or modules, related processes, and related articles, for example webs, produced thereby.

A known apparatus is shown in FIG. 33. FIG. 33 is a black and white representation. Materials and structures are labeled using color names. Red material enters the island placement station and is sheeted and held on the upper green vacuum anvil roller. Sheeted red parts are carried on vacuum roller to 5 o'clock position where red parts are transferred to the blue adhesive web by activating CAM 1. The blue material is running over three times the speed of the red material. When CAM 1 cycles, the upper green vacuum anvil is lowered and contacts the lower green vacuum roller to transfer a red part. Blue material is die cut and blue labels (with red parts adhered to blue labels) held on the lower green vacuum anvil. Blue labels are carried to 6 o'clock to be placed on the yellow web. CAM 2 cycles to raise the yellow web and pick the blue label from the vacuum drum. The blue label adhesive is facing the yellow web. The yellow web is moving three times faster than the blue web material. The lower green vacuum anvil is mounted directly to a machine cabinet and does not share frame ends with the die rollers and cams.

BRIEF SUMMARY OF THE INVENTION

The invention provides a placement apparatus and method which are practical, reliable, accurate and efficient, and which are believed to fulfill the need and to constitute an improvement over the background technology.

Advantages and significant features of the invention include but are not necessarily limited to that plural webs can be combined, each having different line speeds. This is particularly useful with high value products such as RFID labels, medical epidermal electrodes, hydrogel products, and complex multi-layer labels, because the system minimizes waste web material.

In one aspect, the invention provides an article or island placement apparatus comprising an anvil roller, a die roller communicatively associated with the anvil roller, and a bump transfer roller communicatively associated with the anvil roller.

In another aspect, the invention provides a process for placing articles or islands on a web, comprising the steps of providing a stream of articles, placing the articles on the anvil roller, moving the anvil roller, moving an output web, and periodically bringing the output web into communicative association with the anvil roller whereby the articles are transferred to the output web at a predetermined distance from each other.

The features, benefits and objects of the invention will become clear to those skilled in the art by reference to the following description, claim(s), if any, and drawings.

DETAILED DESCRIPTION

Figure 1:
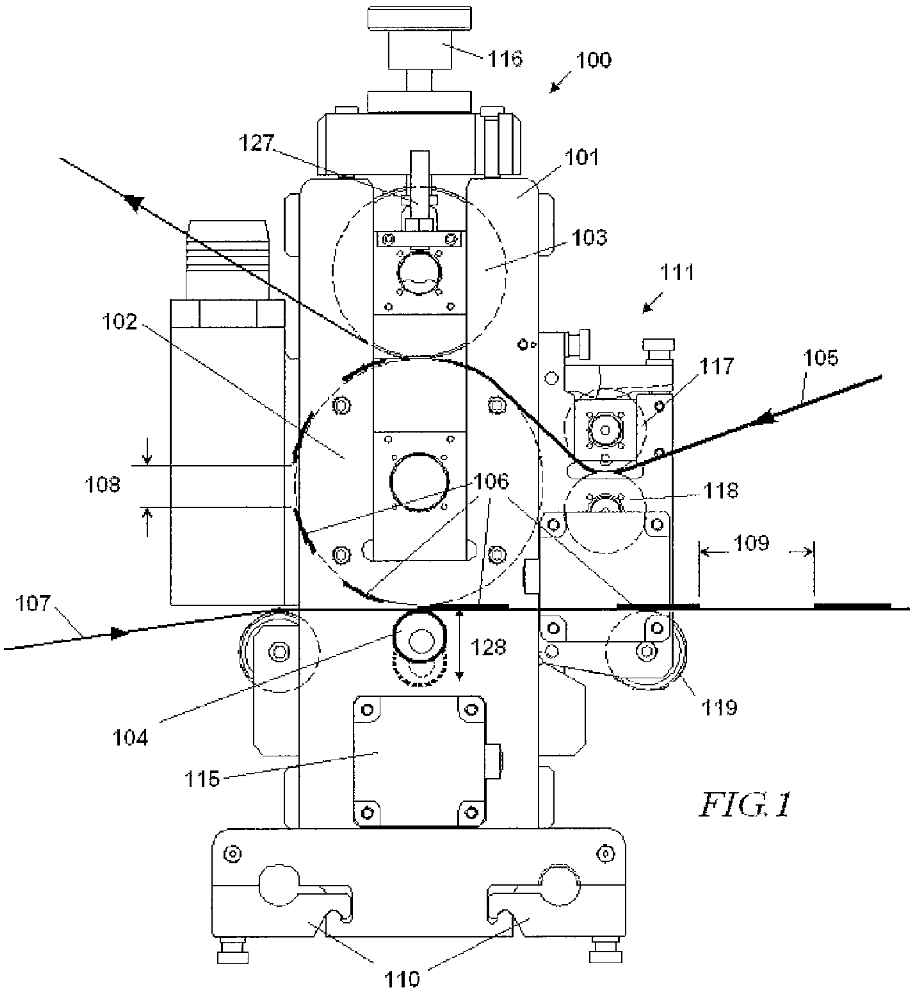
FIG. 1 is a diagram showing an embodiment of the operation of the island placement station system of the present invention.
Figure 2:
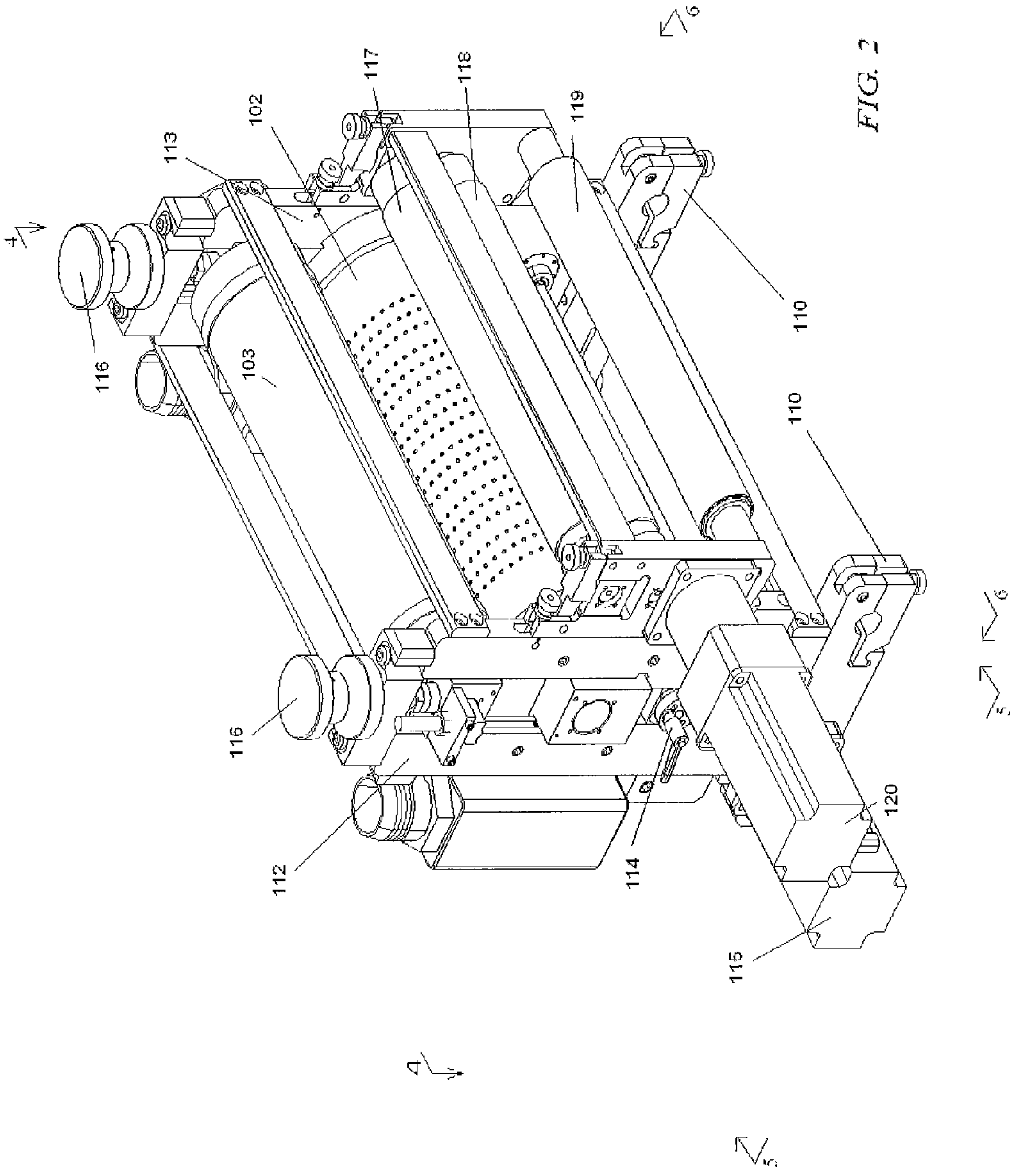
FIG. 2 is a perspective view of an embodiment of an island placement apparatus.
Figure 3:
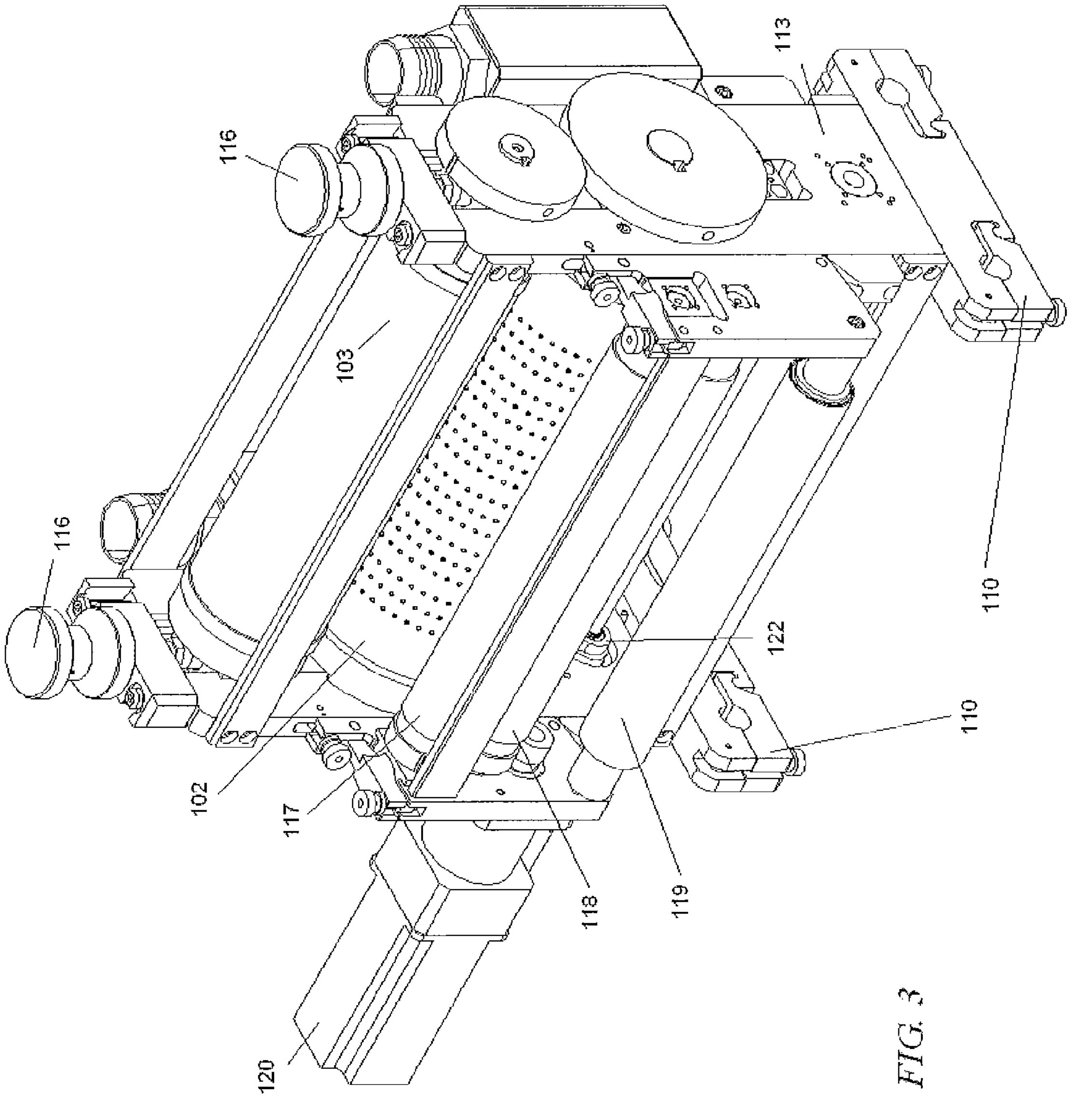
FIG. 3 is another perspective view of the island placement apparatus of FIG. 2.
Figure 4:
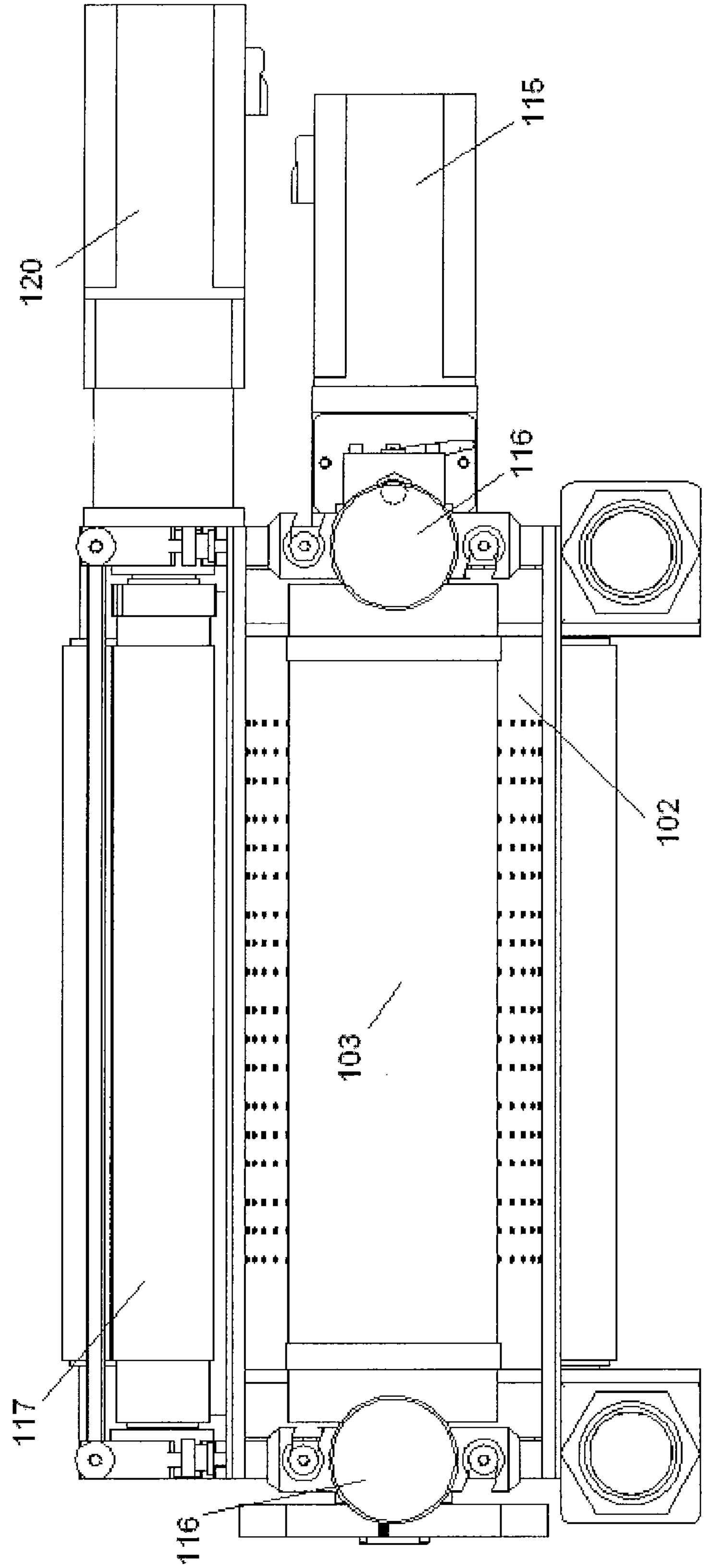
FIG. 4 is a top or plan view of the island placement apparatus of FIG. 2 taken along line 4-4.
Figure 5:
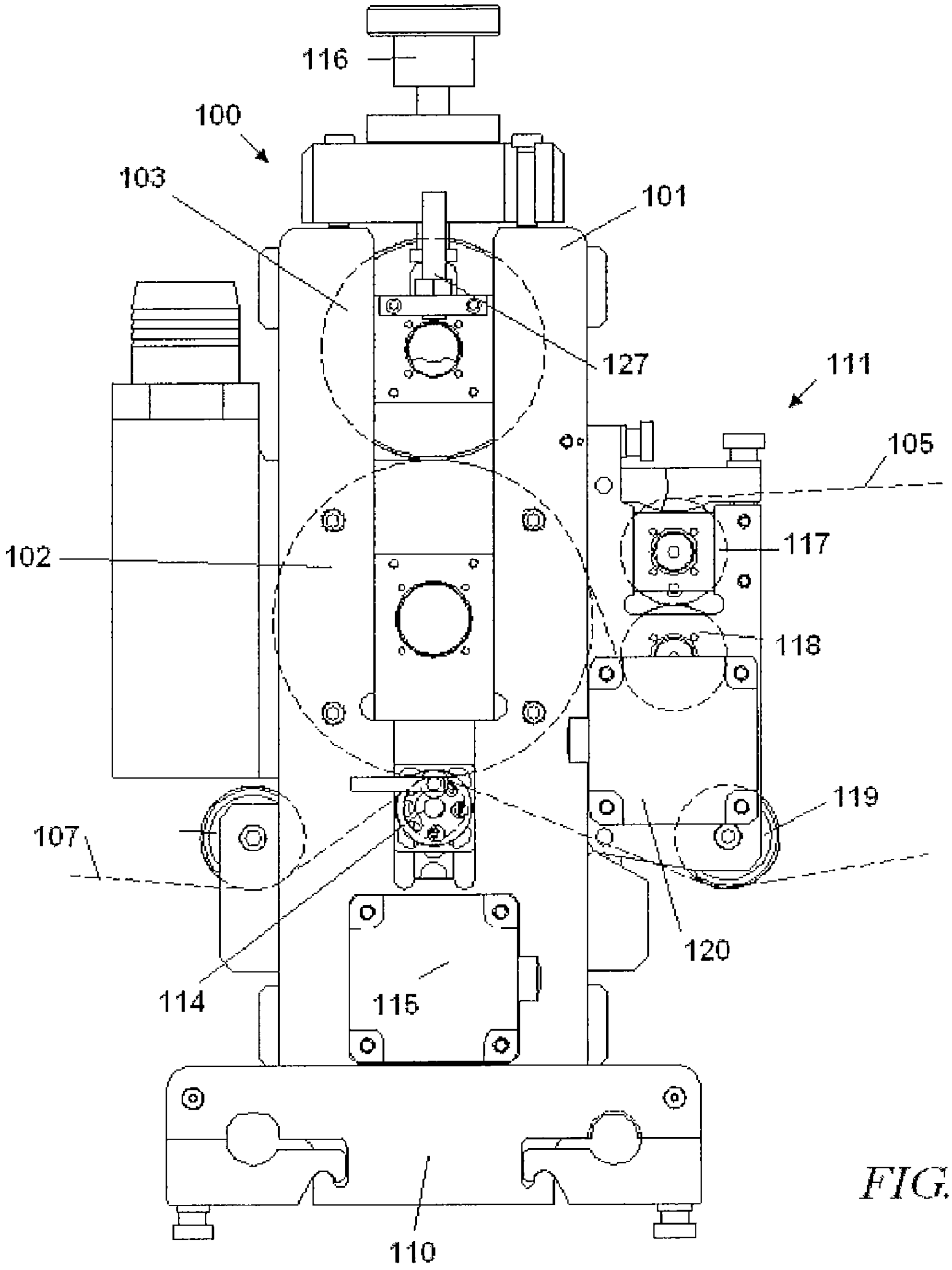
FIG. 5 is a side view of the island placement apparatus of FIG. 2 taken along line 5-5.
Figure 6:
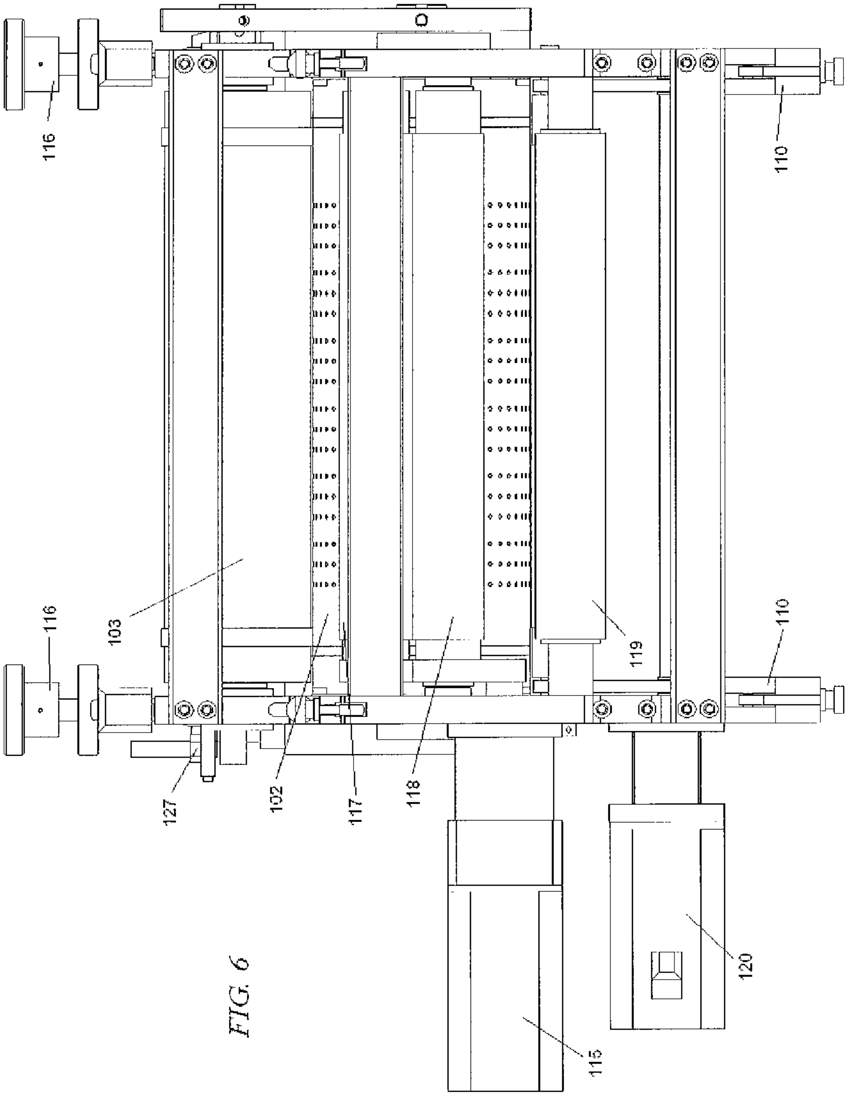
FIG. 6 is a front view of the island placement apparatus of FIG. 2 taken along line 6-6.
Figure 7:
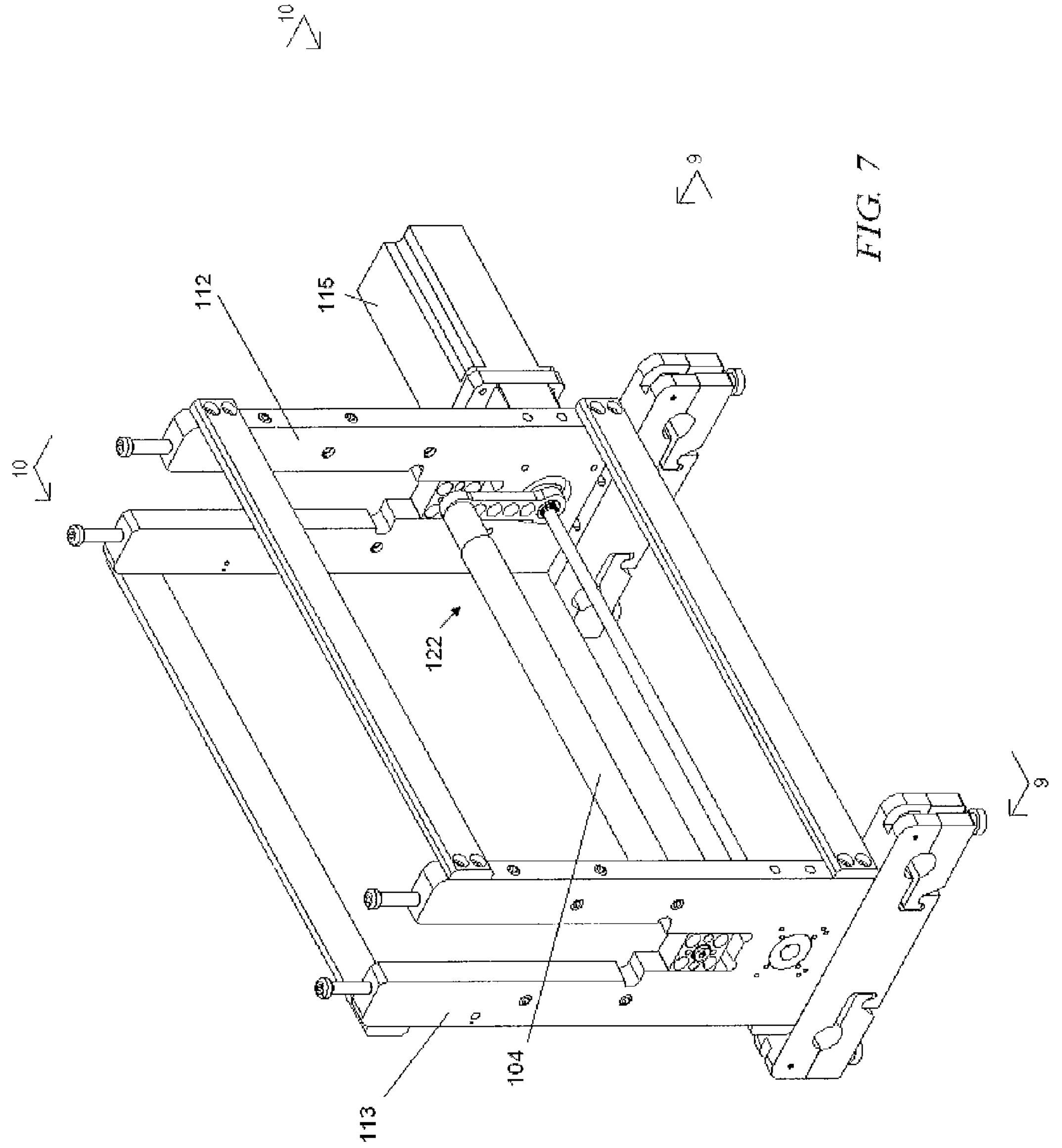
FIG. 7 is a perspective view of an embodiment of a cam station for use with the apparatus of FIG. 2.

Referring to FIGS. 1-32, embodiments of the invention are illustrated.

The basic structure of the apparatus of the invention comprise an anvil roller, a die roller communicatively associated with the vacuum roller, and a bump transfer roller communicatively associated with the anvil roller.

Preferably, a first web with repeating or non-repeating articles (such as labels or other material) spaced a first predetermined distance from each other, or unspaced, is communicatively coupled to the die roller via an infeed nip roller. The first web is cut with the die roller at the appropriate location or length. The first web cut parts are retained on the anvil roller by vacuum or an affinity for the anvil rollers surface a predetermined distance from each other.

A second web is communicatively associated with the anvil roller. Articles are transferred from the anvil roller to the second web by action of the bump transfer roller bringing the second web into communicative contact with the anvil roller. The articles are spaced on the second web a second predetermined distance from each other as a function of the speed of the second web, speed of the anvil roller and actuation of the bump transfer roller.

The second predetermined distance may be greater than the first predetermined distance. Alternatively, the second predetermined distance may be the less than, or the same as, the first predetermined distance.

The basic process for placing articles on a web, comprises the steps of providing a stream of articles on a first or input web at a first rate, placing the articles on the anvil roller at first predetermined distance from each other, moving anvil roller, moving a second or output web, and periodically bringing the second web into communicative association with the anvil roller whereby the articles are transferred to the second web.

The step of periodically bringing the second web into communicative association with the anvil roller is preferably accomplished by bumping the output web toward the anvil roller.

The articles are spaced on the output web at a predetermined distance from each other.

Articles or parts may be cut from the first web at an appropriate location or length. The cut parts are held on the anvil roller the first predetermined distance from each other. The second web is moved and periodically brought into communicative association with the anvil roller whereby the cut parts are transferred to the second web at the first predetermined distance or a second, different predetermined distance.

Detailed structure and function of the apparatus and processes of the invention are shown in the drawings.

FIGS. 1-10 illustrate an embodiment of a placement apparatus 100. The apparatus includes a frame 101, a vacuum anvil roller 102 with attached vacuum manifolds (see also FIGS. 15-17), a die roller 103, a bump transfer roller assembly 122, a bridge press 116 (see also, FIGS. 22-25), a die registration module 127 (see also, FIGS. 26-32) for sensing the position of the die roller 103 and clamps 110 (see also, FIGS. 11-14) for mounting the apparatus as a unit to a web processing machine. The placement apparatus frame 101 includes a first end plate 112 and a second end plate 113. In the illustrated embodiment, the first end plate 112 and the second end plate 113 are relatively flat plates and are parallel to each other. Each of the die roller 103, the vacuum anvil roller 102 and the bump transfer roller assembly have approximately equal lengths and extend between the first end plate 112 and the second end plate 113. The bump transfer roller assembly 122 includes a bump transfer roller 104 with an eccentric shaft, a bump transfer roller manual adjustment 114, to adjust the position of placed article and the pressure applied to the articles when the rollers bump the second web toward the anvil, and a bump transfer servo motor 115 to move the bump transfer roller in a translational motion 128. Some figures show a first web 105 passing into the frame 101 and between the anvil roller 102 and the die roller 103, and cut articles 106 being transferred to a second web 107 using the anvil roller 102. The illustrated embodiments show a first spacing 108 of the cut articles on the anvil roll and a second spacing 109 of the cut articles 106 as applied to the second web 107. Also shown are placement apparatus embodiments with an input nip station 111 attached to the placement apparatus 100. The input nip station 111 includes an idler roll 119, an idler nip roller 117, a servo driven nip roller 118 and an infeed nip servo motor 120.

Various embodiments of the placement apparatus include an island placement assembly and a nip infeed assembly. The island placement assembly includes an island placement frame, a die roller, an anvil roller, a bump transfer roller, and a servo motor. The island placement frame includes a first end plate and a second end plate. The island placement frame is sized to allow a first web and a second web to travel past the island placement frame between the first and second end plates of the frame. The die roller is mounted to and extends between the first and second end plates of the island placement frame. The anvil roller is mounted to and extends between the first and second ends of the island placement frame. The die roller and the anvil roller are adapted to cooperate to receive the first web and cut articles from the first web for transfer of the articles by the anvil roller to the second web. The bump transfer roller is mounted to and extends between the first and second ends of the island placement frame. The bump transfer roller has an axis of rotation, and is adapted to translationally move with respect to the first and second end plates between a first position for the axis of rotation and a second position of the axis of rotation. The anvil roller and the bump transfer roller are adapted to allow the second web to pass between the anvil roller and the bump transfer roller. The bump transfer roller is adapted to move the second web toward the anvil roller when the bump transfer roller moves from the first position to the second position. The servo motor is mechanically linked to the bump transfer roller to control translational motion of the bump transfer roller between the first position and the second position.

The nip infeed assembly includes a nip assembly frame, a first roller, a second roller, and a servo motor. The nip assembly frame includes a first end plate and a second end plate, and is connected to the island placement frame. The first roller extends between the first and second end plates of the nip assembly frame. The second roller extends between the first and second end plates of the nip assembly frame. The servo motor is mechanically linked to the first and second rollers to control motion of the first web to the die roller and the anvil roller.

The illustrated embodiment of the placement apparatus includes a first idler roller positioned on a first side of the bump transfer roller and a second idler roller positioned on a second side of the bump transfer roller to assist with travel of the second web between the bump transfer roller and the anvil roller. The illustrated placement apparatus also includes a first mounting clamp connected to the first end plate of the island placement frame and a second mounting clamp connected to the second end plate of the island placement frame for use in mounting the island placement frame to an automated converting machine.

In the illustrated embodiment if the placement apparatus, the bump transfer roller moves between a first position away from the anvil roller and a second position near the anvil roller. The bump transfer roller includes an eccentric shaft and a manual adjustment used to rotate the eccentric shaft to adjust the second position of the axis of rotation. Adjustment of the second position of the anvil roller allows an operator to make some adjustment of the position of the cut articles on the second web, as well as, the pressure, if any, with which the bump transfer roller presses against the anvil roller at or near the second position. The first end plate and the second end plate have a top end with an opening sized to top load the anvil roller and the die roller. The placement apparatus includes a first bridge press adapted to be connected to the top end of the first end plate and a second bridge press adapted to be connected to the top end of the second end plate. The first and second bridge presses are adapted to provide a manually-adjusted force to press the die roller against the anvil roller. In the illustrated placement apparatus, the anvil roller includes a vacuum anvil.

In various embodiments, the placement apparatus includes a frame, a die roller, an anvil roller, a bump transfer roller and a motor mechanically linked to the bump transfer roller. The frame includes a first end and a second end and is sized to allow a first web and a second web to pass between the first end and the second end of the frame. The die roller is mounted to and extends between the first and second ends of the frame. The anvil roller is mounted to and extends between the first and second ends of the frame. The anvil roller cooperates with the die roller to receive the first web and cut articles from the first web. The articles are cut from the first web for transfer by the anvil roller to the second web. In various embodiments, the anvil roll is a vacuum anvil roller. The bump transfer roller is mounted to and extends between the first and second ends of the frame. The bump transfer roll has an axis of rotation and is adapted to move translationally between a first position of the axis of rotation and a second position of the axis of rotation. The anvil roller and the bump transfer roller are adapted to allow the second web to pass between the anvil roller and the bump transfer roller. The bump transfer roller is further adapted to move the second web toward the anvil roller when the bump transfer roller moves from the first position to the second position. The motor mechanically linked to the bump transfer roller controls the translational motion of the bump transfer roller as it moves between the first position and the second position. The mechanical linkage between the bump transfer servo motor 115 and the bump transfer roller 104 includes an eccentric shaft 132, illustrated in FIG. 8, that is rotated by the motor 102 to move the bump transfer roller 104 between the first and second positions.

In various embodiments of the placement apparatus, the articles are transferred from the first web to the anvil roller. The bump transfer roller operates on the second web to acquire the articles from the anvil roller and place the articles an the second web at a predetermined distance from each other. In some embodiments, the predetermined distance differs from the spacing distance of the articles on the first web. In various embodiments, the predetermined distance is less than the article spacing on the first web. In some embodiments, the predetermined distance is greater than the article spacing on the first web.

In various embodiments, the placement apparatus includes a first mounting clamp connected to the first end of the frame and a second mounting clamp connected to the second end of the frame for use in mounting the frame to an automated converting machine.

Figure 8:
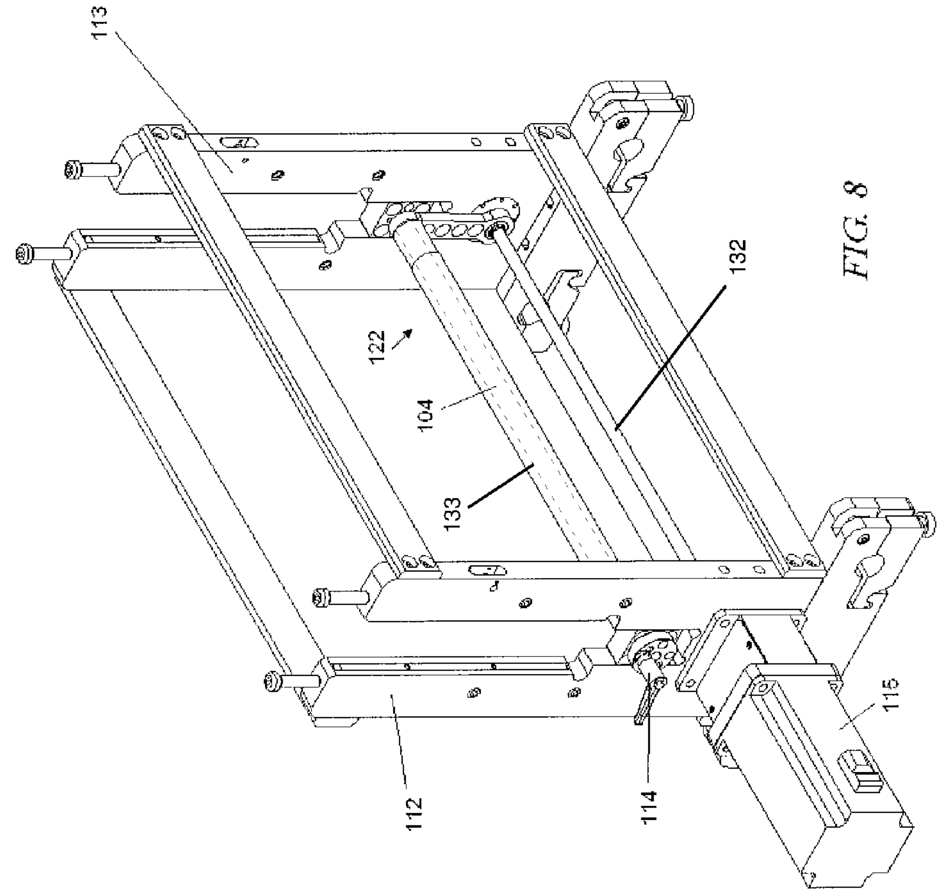
FIG. 8 is another perspective view of the cam station.
Figure 9:
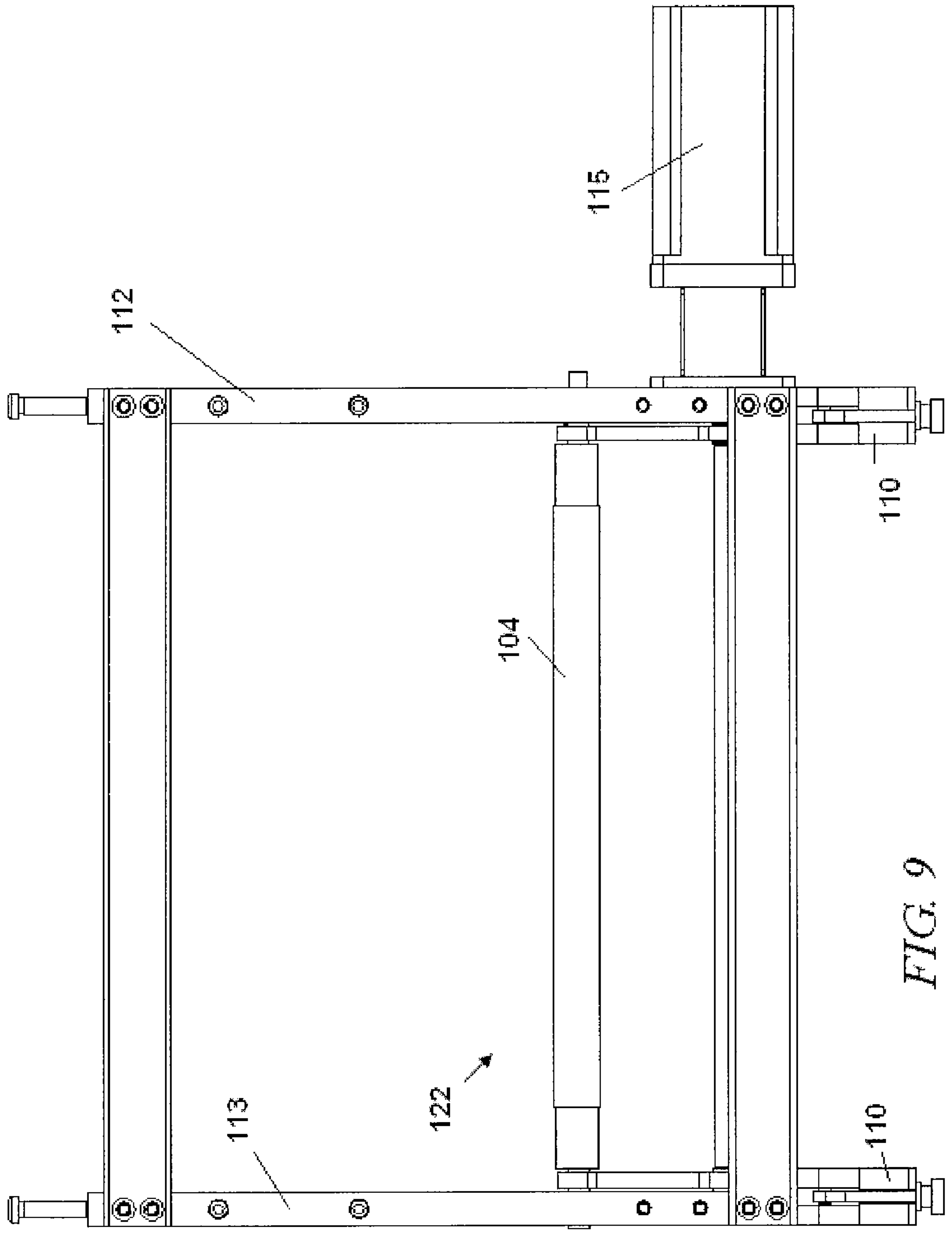
FIG. 9 is a front view of the cam station of FIG. 7 taken along lines 9-9.
Figure 10:
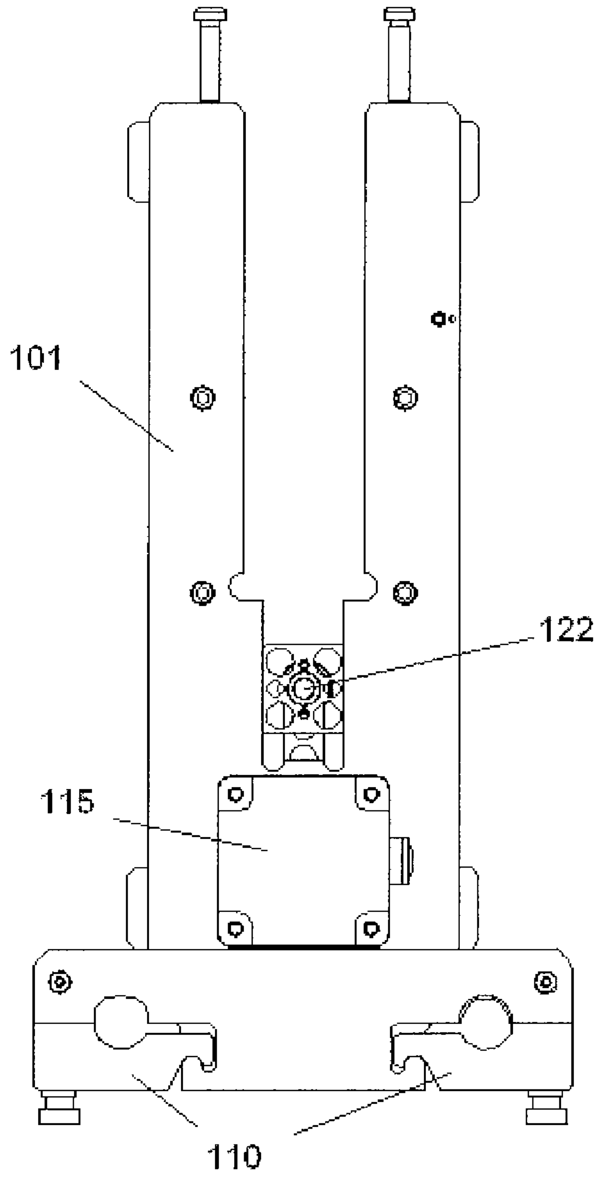
FIG. 10 is an end view of the cam station of FIG. 7 taken along line 10-10.
Figure 11:
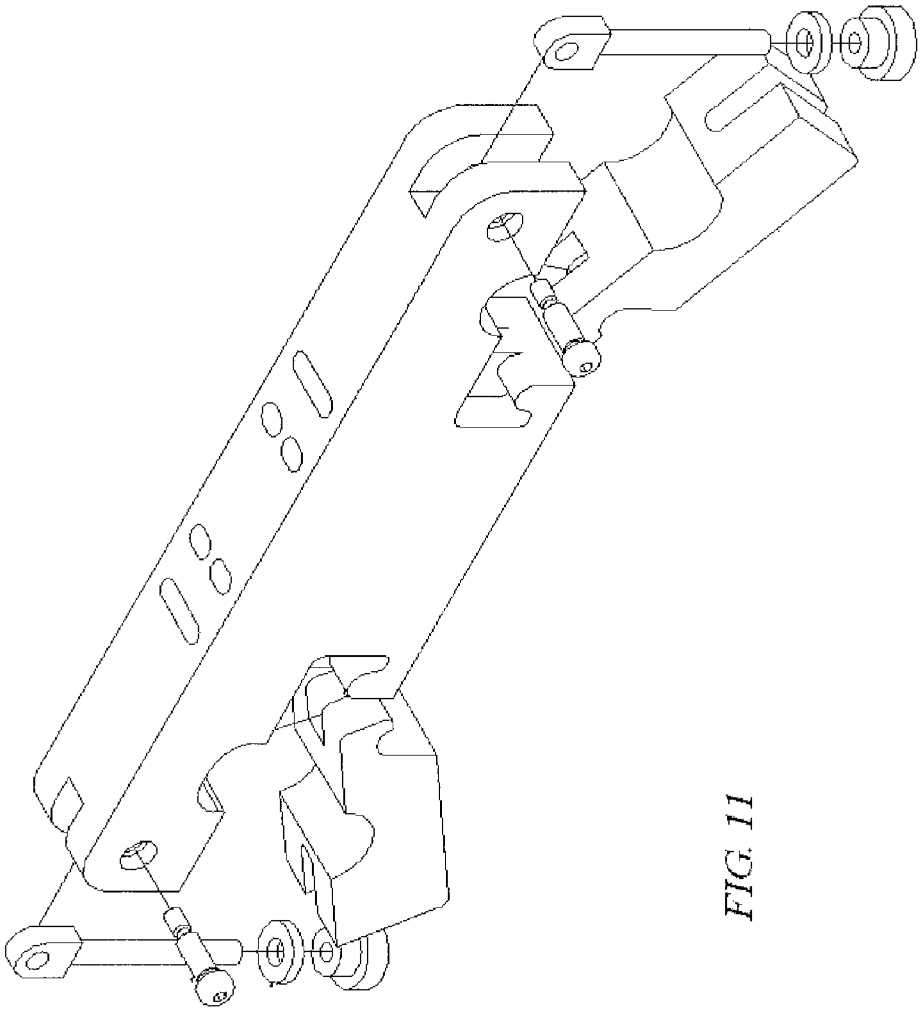
FIG. 11 is a perspective view of a mounting clamp for use with the apparatus of FIG. 2.
Figure 12:
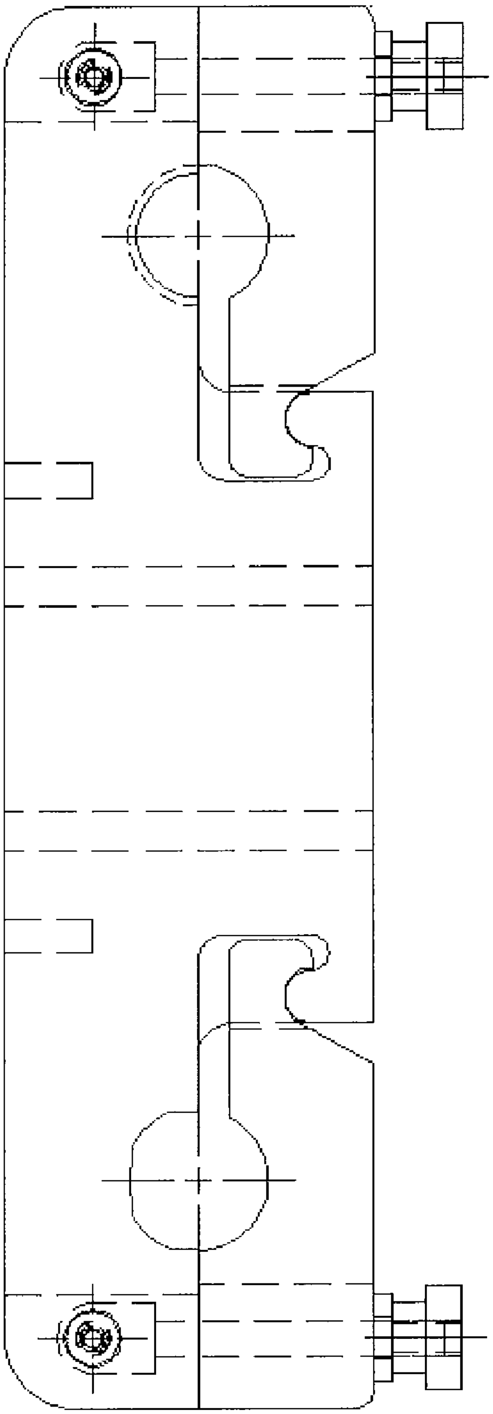
FIG. 12 is a front view of the mounting clamp.
Figure 13:
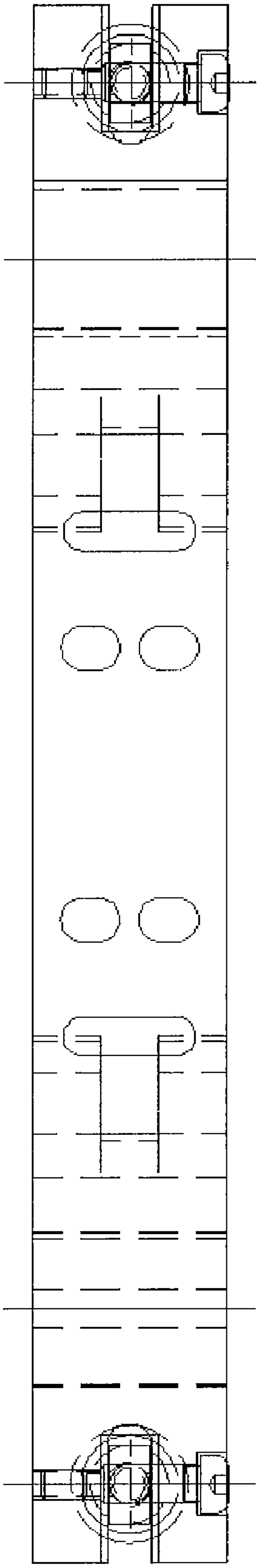
FIG. 13 is a top view of the mounting clamp.
Figure 14:
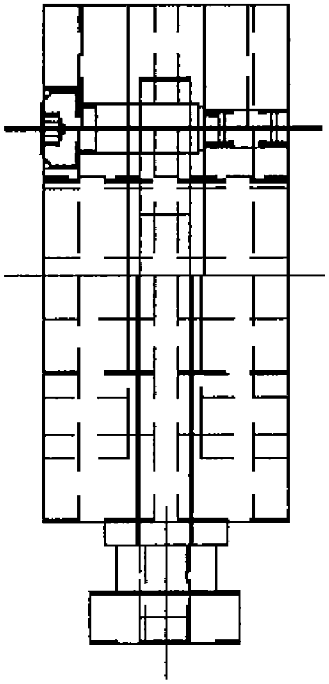
FIG. 14 is an end view of the mounting clamp.
Figure 15:
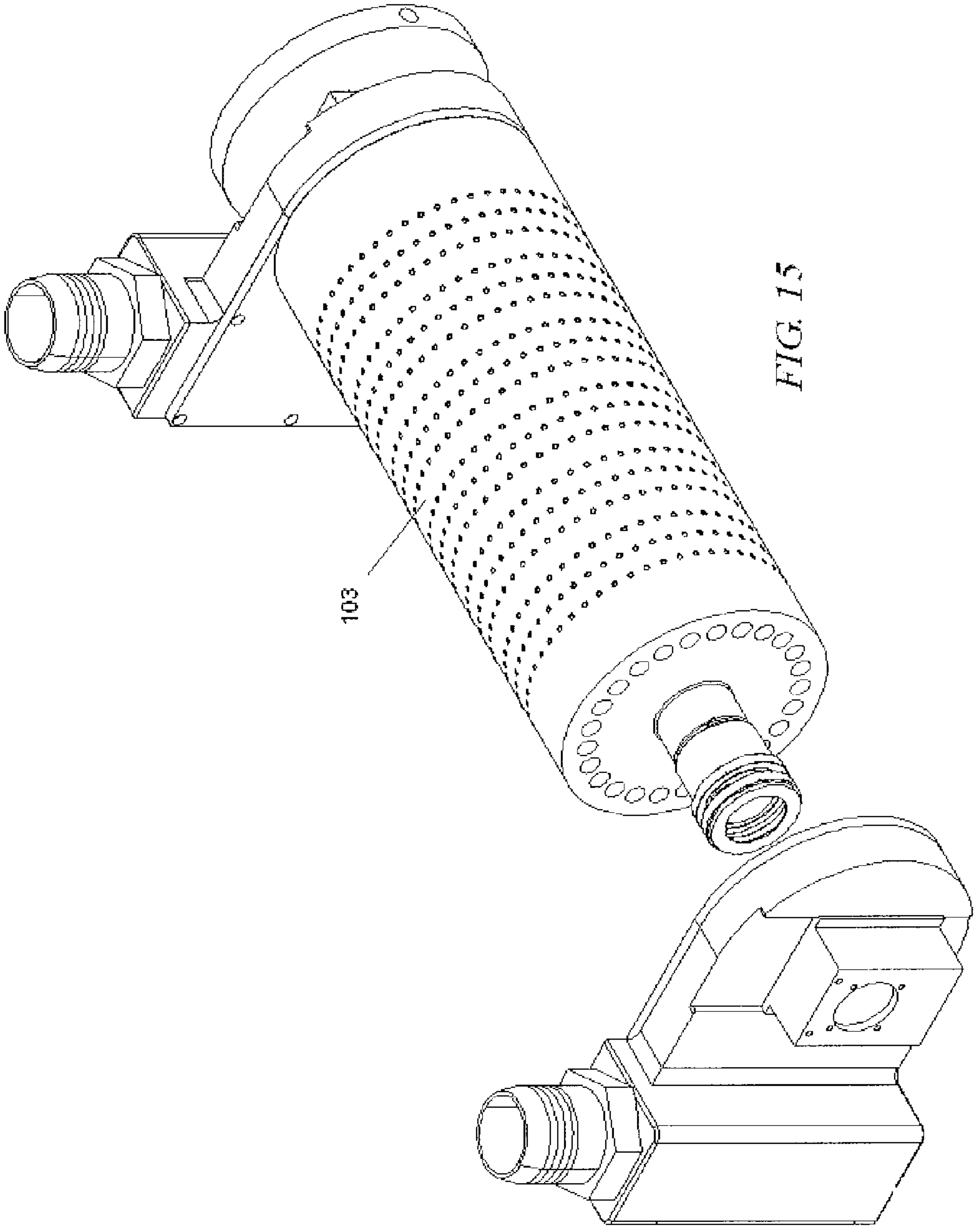
FIG. 15 is a perspective view of an embodiment of a vacuum roll used with the apparatus of FIG. 2.
Figure 16:
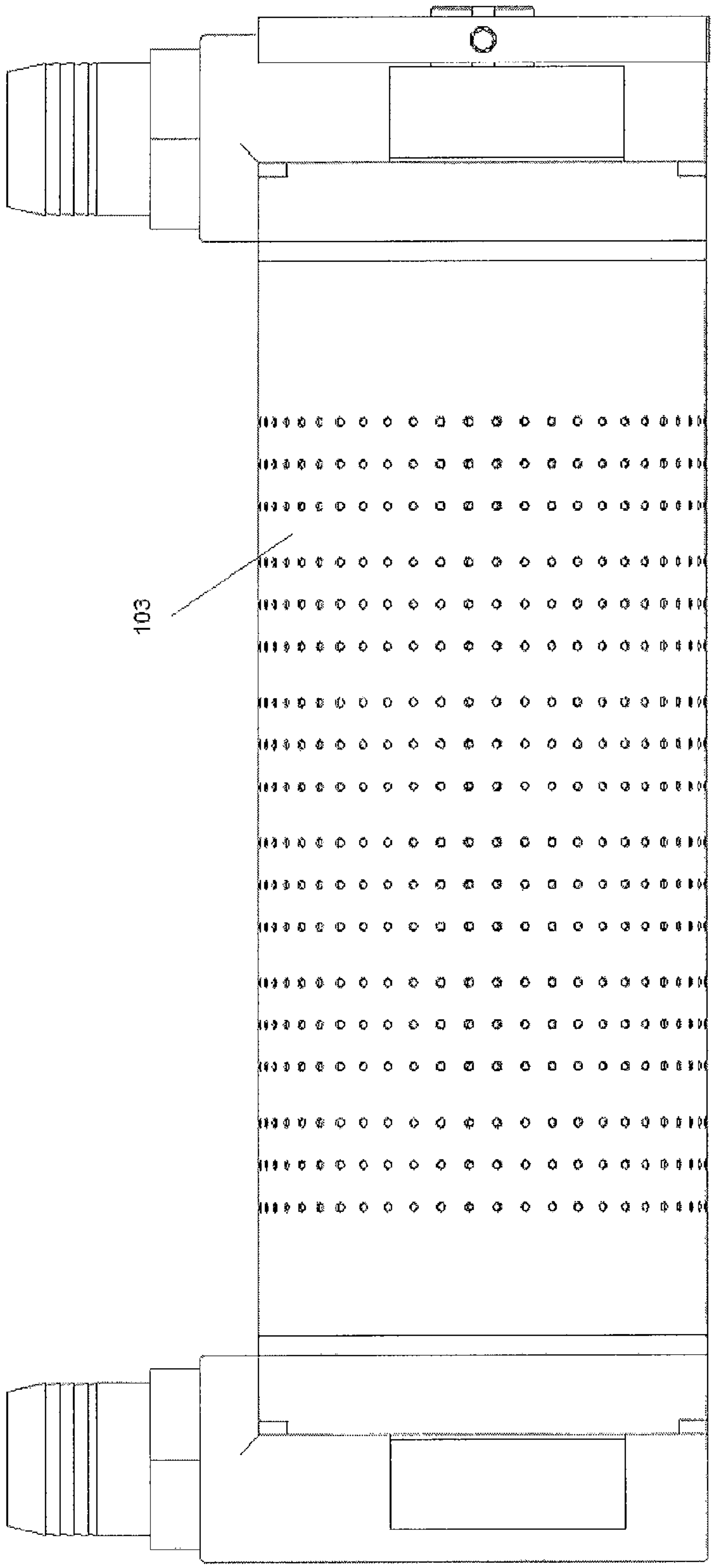
FIG. 16 is a front view of the vacuum roll.
Figure 17:
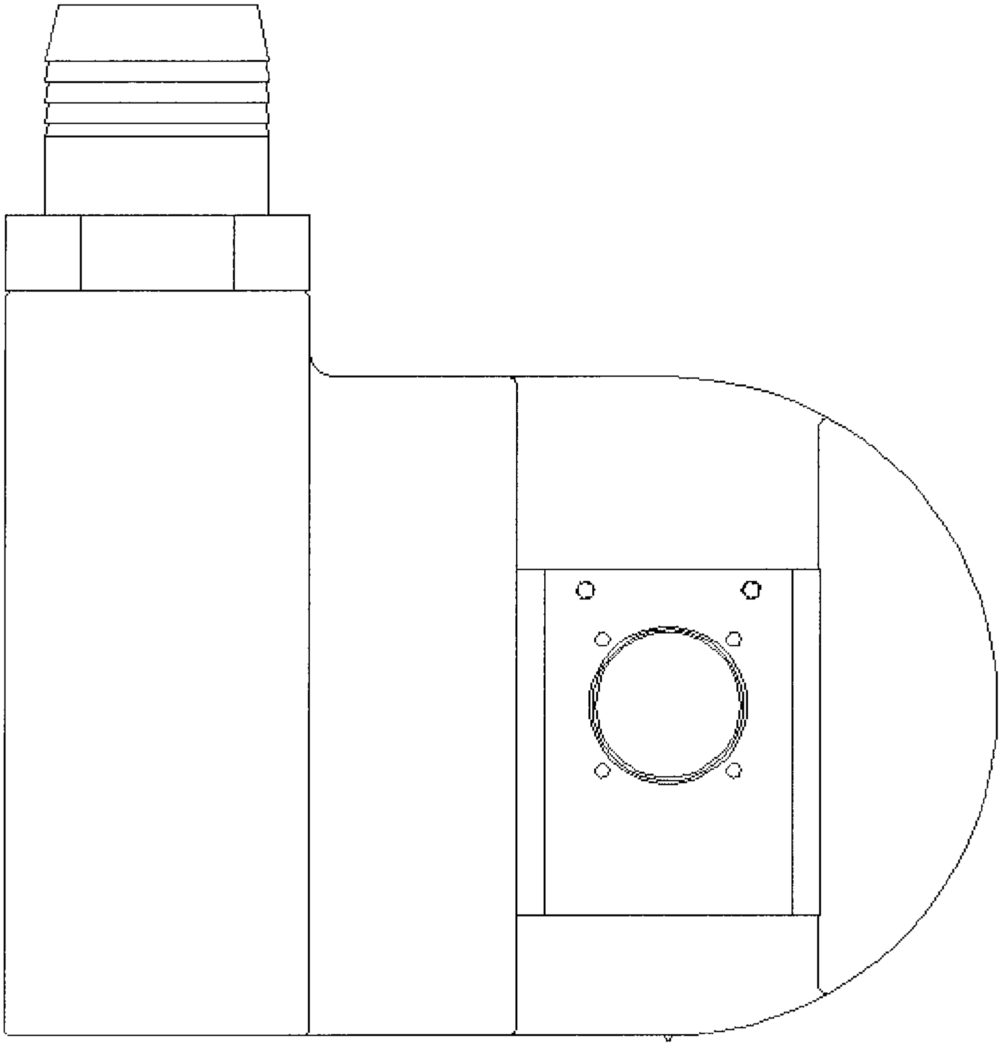
FIG. 17 is an end view of the vacuum roll.
Figure 18:
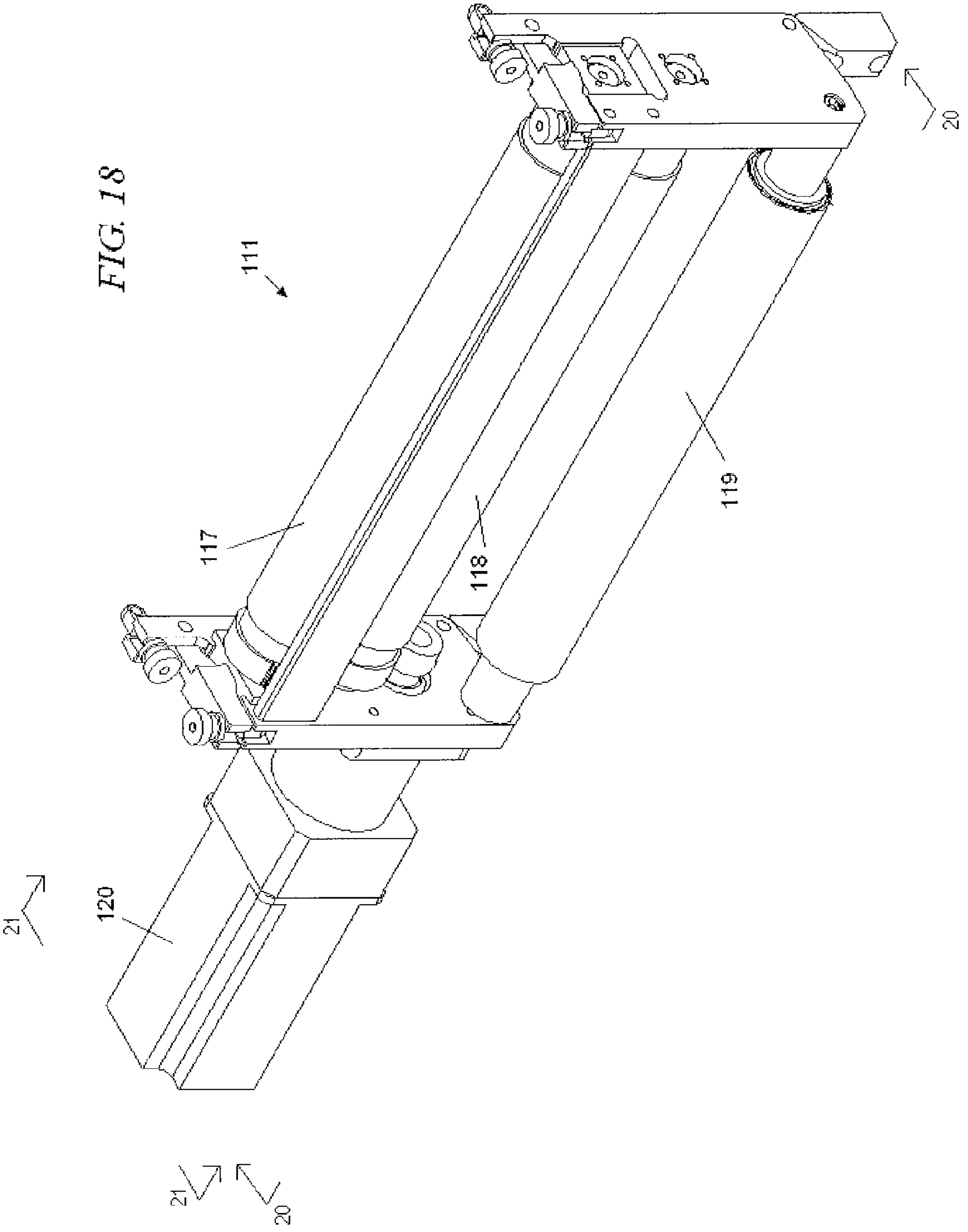
FIG. 18 is a perspective view of an embodiment of the nip infeed assembly of the apparatus used with the apparatus of FIG. 2.
Figure 19:
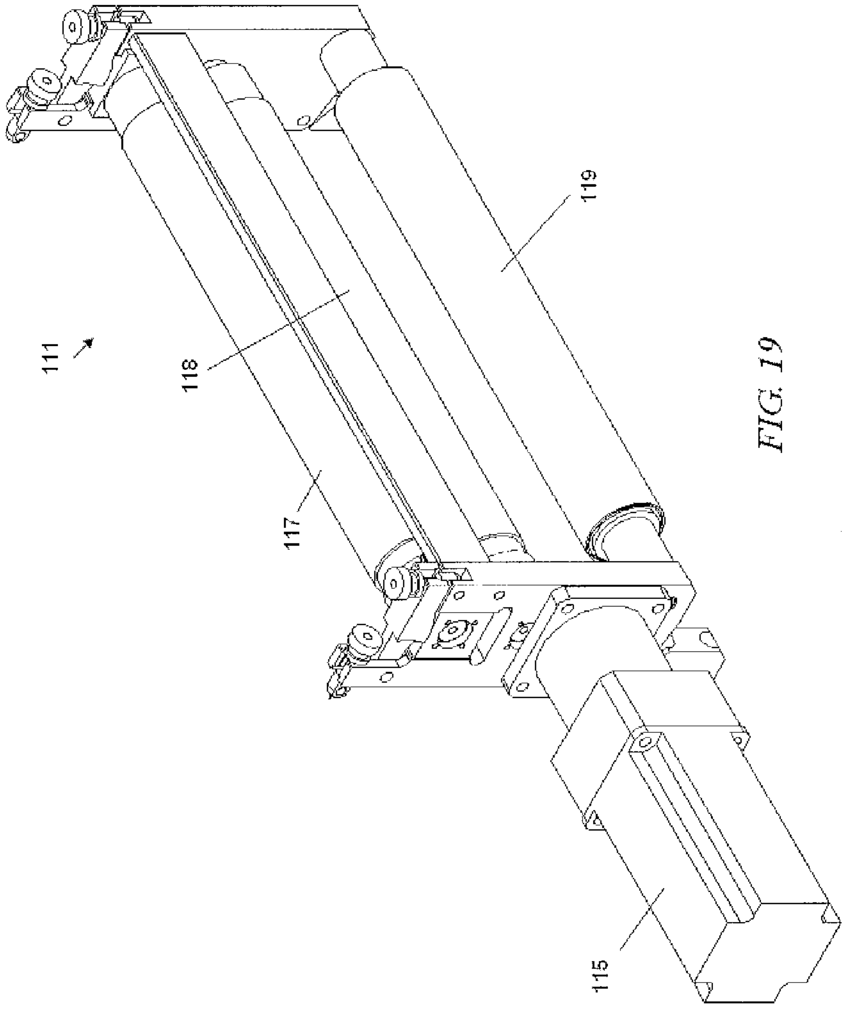
FIG. 19 is another perspective view of the nip infeed assembly.
Figure 20:
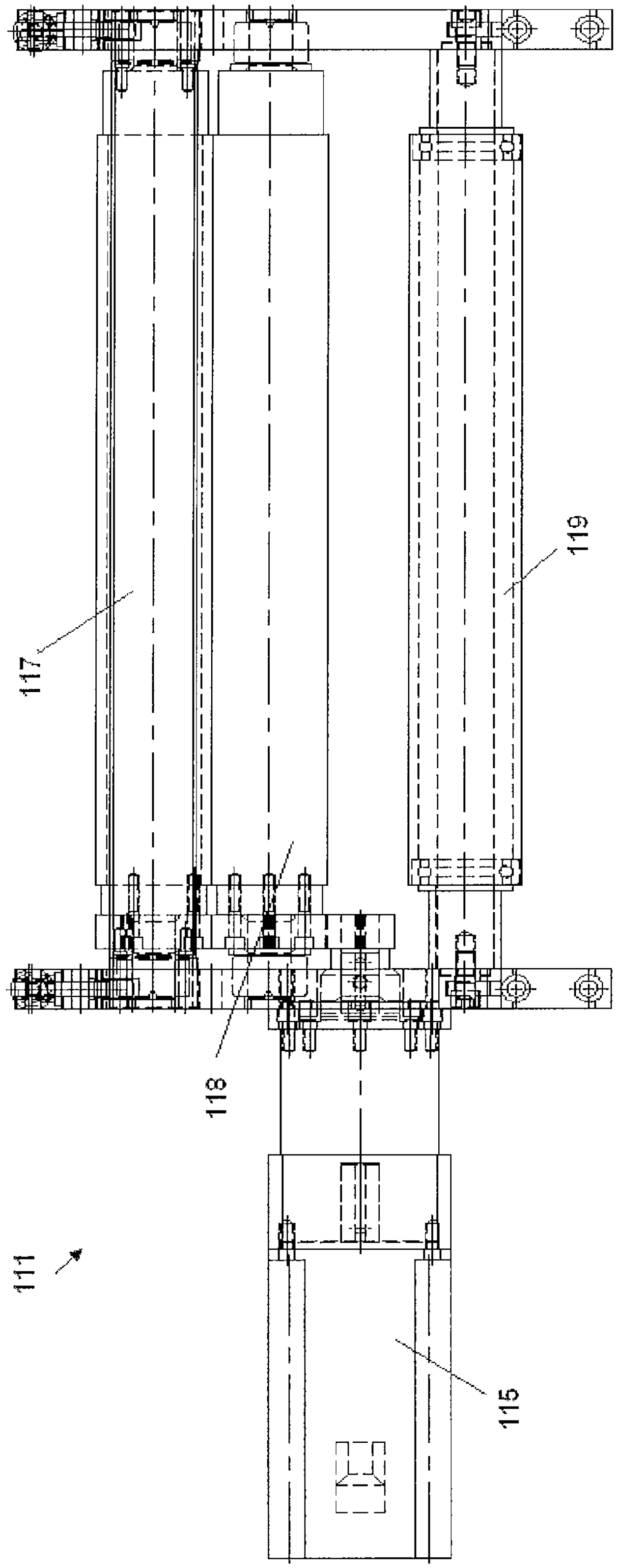
FIG. 20 is a front view of the nip infeed assembly of FIG. 18 taken along line 20-20.
Figure 21:
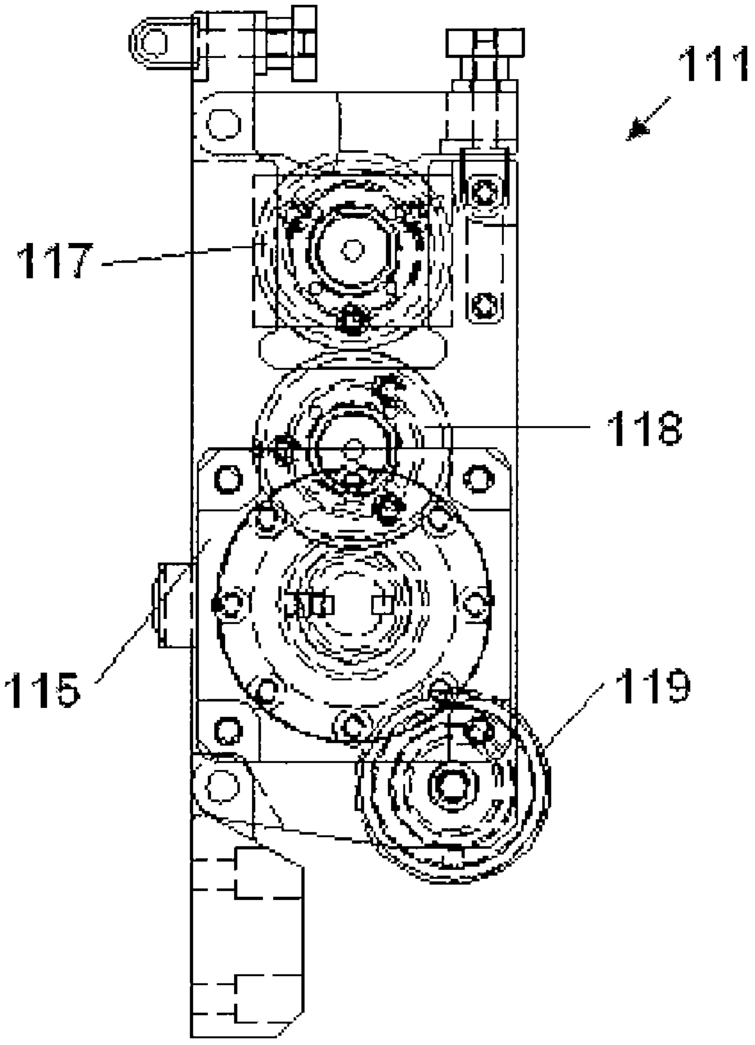
FIG. 21 is an end view of the nip infeed assembly of FIG. 18 taken along line 21-21.
Figure 22:
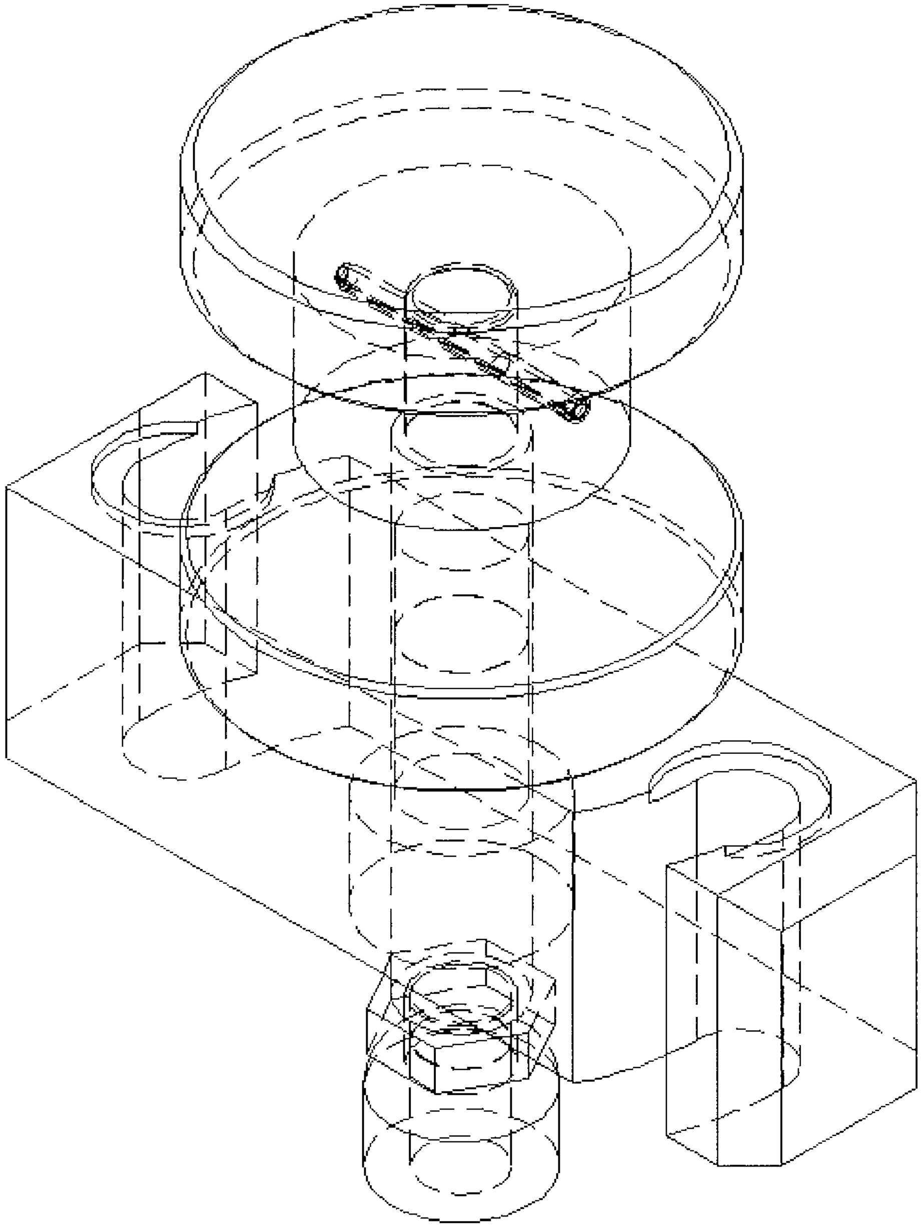
FIG. 22 is a perspective view of an embodiment of a bridge press used with the apparatus of FIG. 2.
Figure 23:
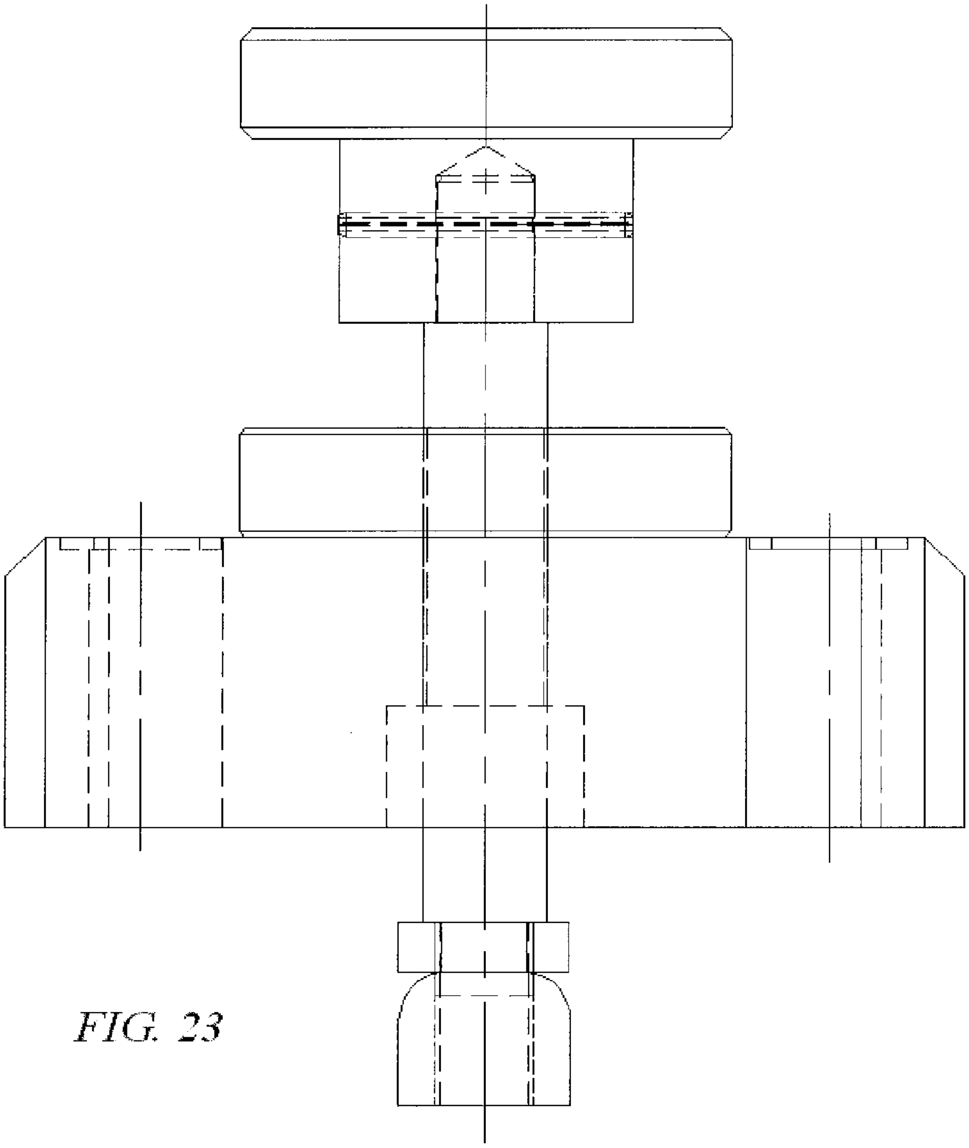
FIG. 23 is a front view of the bridge press.
Figure 24:
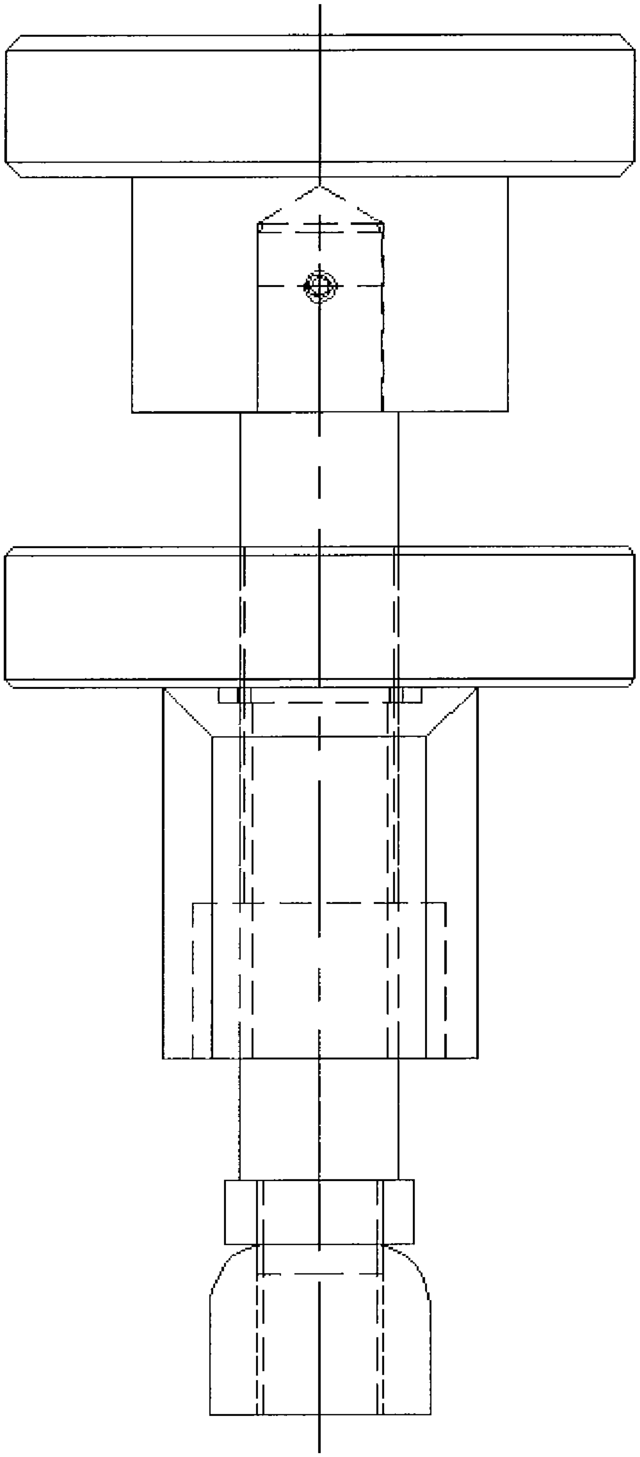
FIG. 24 is an end view of the bridge press.
Figure 25:
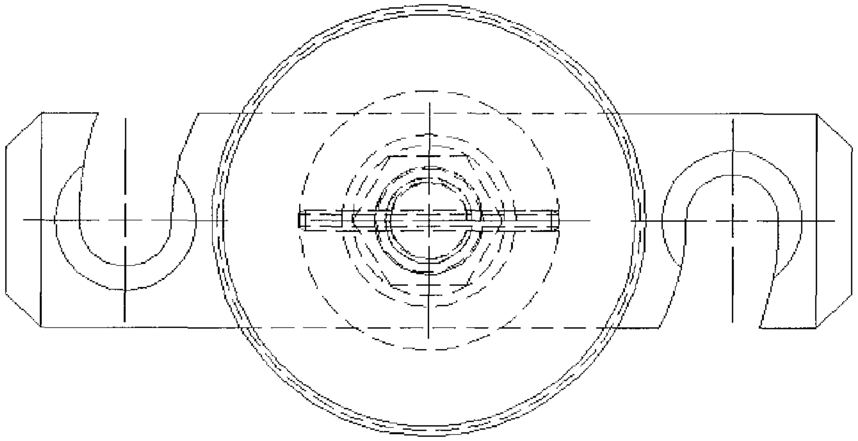
FIG. 25 is a top view of the bridge press.
Figure 26:
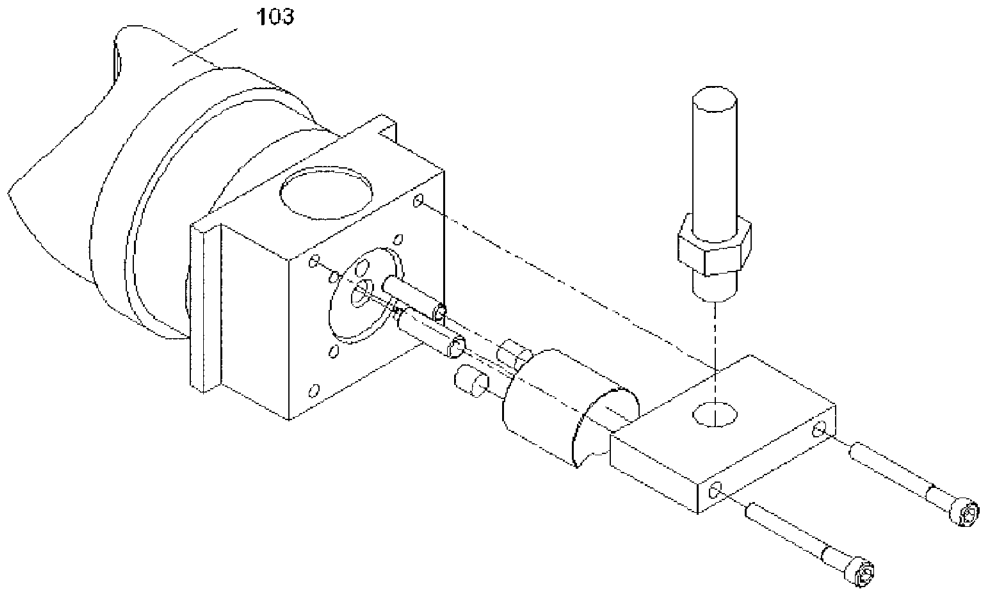
FIG. 26 is an exploded view of an embodiment of a die registration assembly used with the apparatus of FIG. 2.
Figure 27:
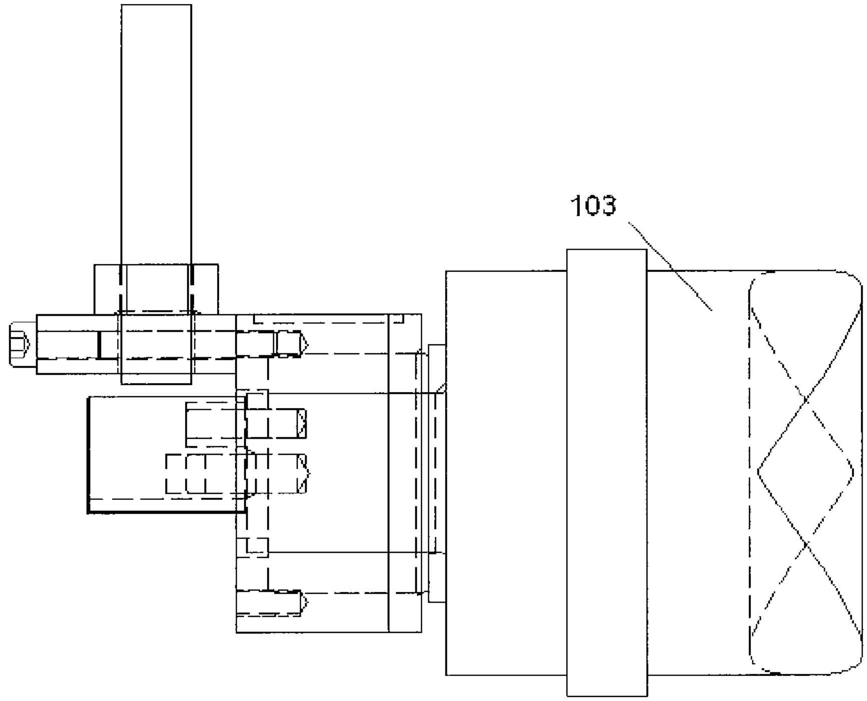
FIG. 27 is a front view of the die registration assembly.
Figure 28:
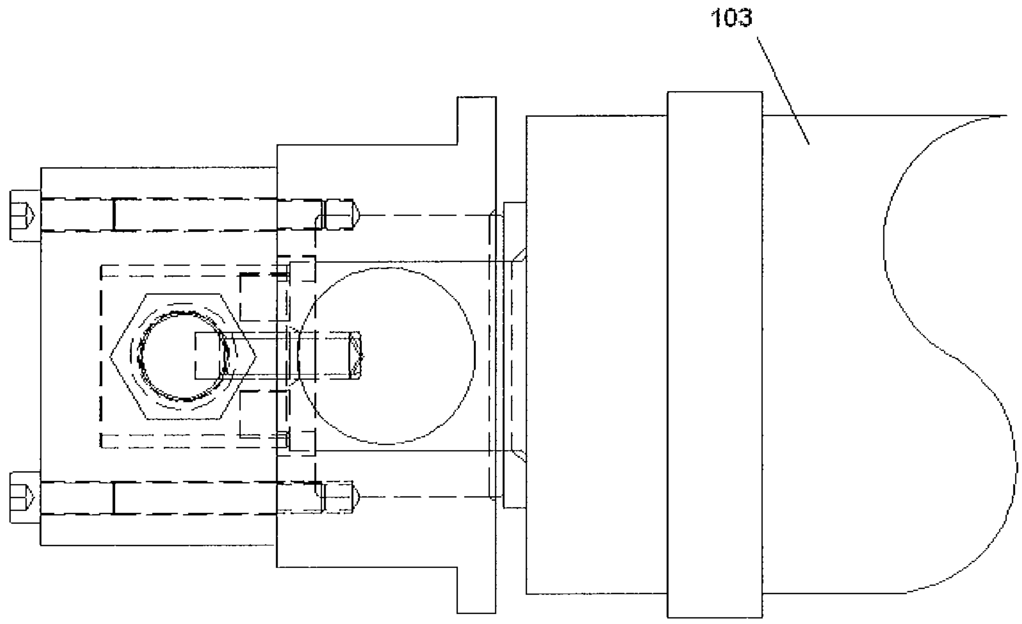
FIG. 28 is a top view of the die registration assembly.
Figure 29:
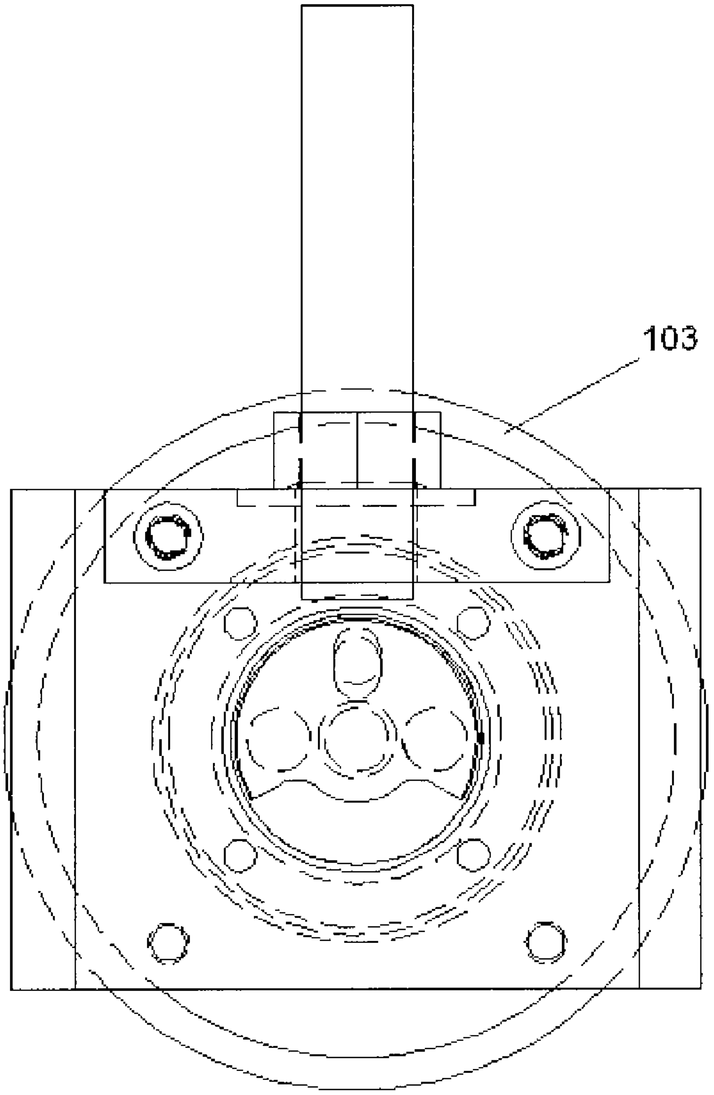
FIG. 29 is an end view of the die registration assembly.
Figure 30:
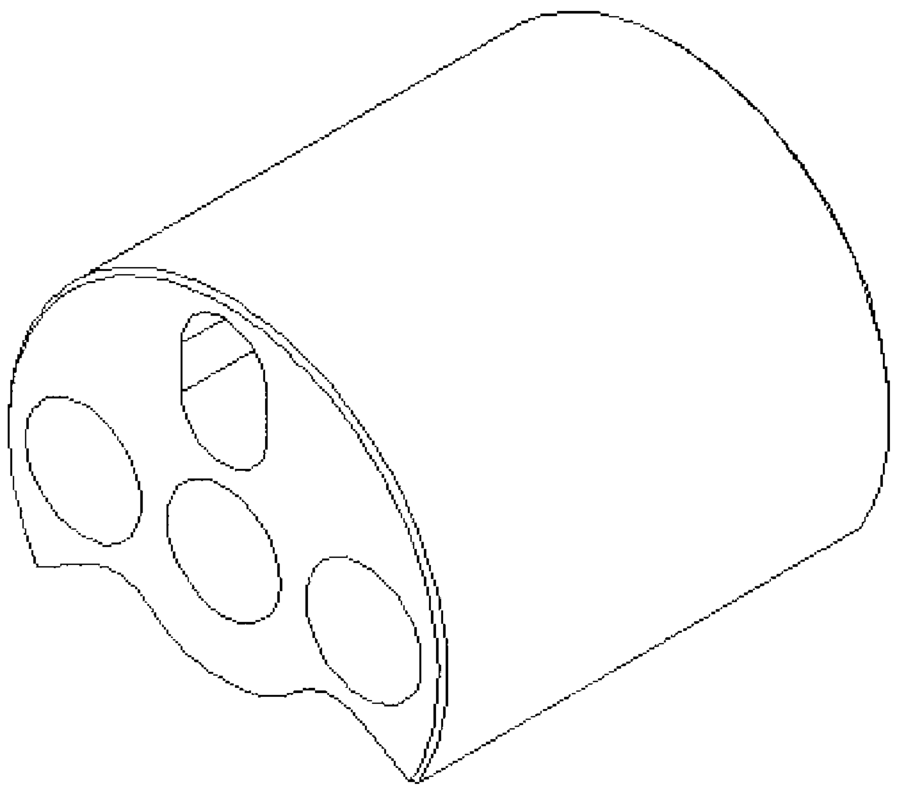
FIG. 30 is a perspective view of an embodiment of a die registration cam used with the die registration assembly.
Figure 31:
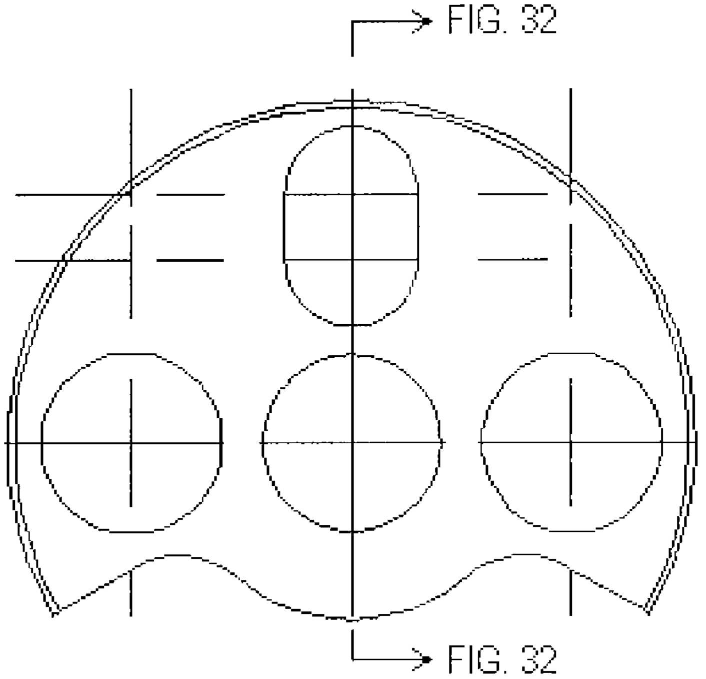
FIG. 31 is a front view of the die registration cam.
Figure 32:
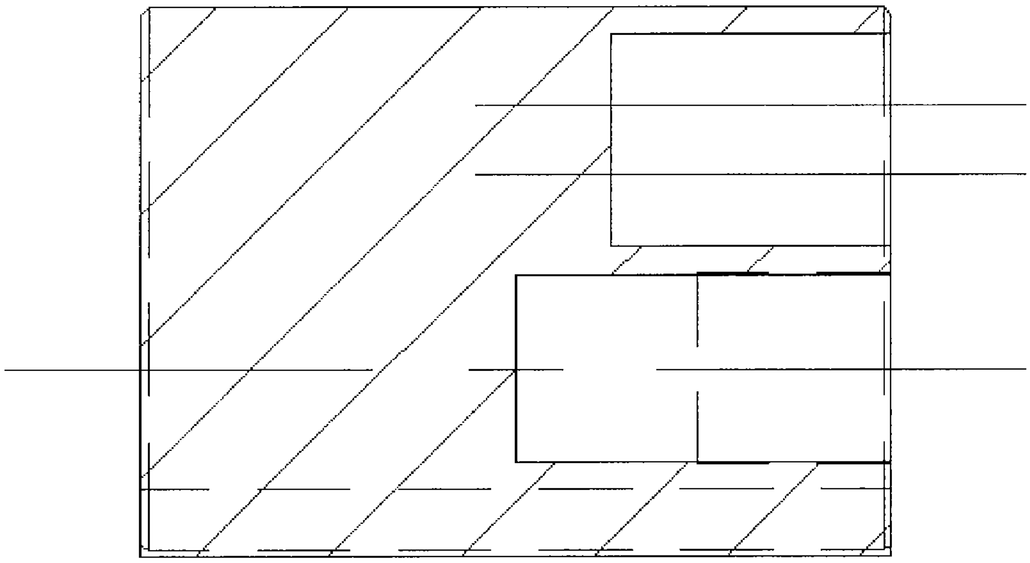
FIG. 32 is a cross-sectional view of the die registration cam taken along line A-A of FIG. 31.
Figure 33:
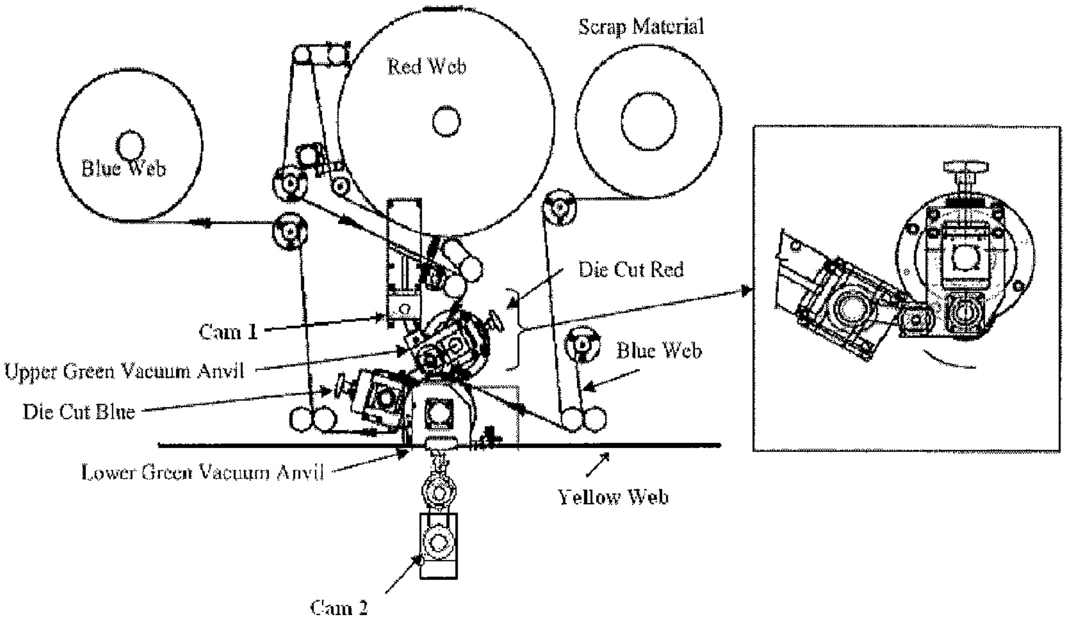
(PRIOR ART) FIG. 33
FIG. 33 is a known apparatus.

In various embodiments of the placement apparatus and with reference to FIG. 8, the bump transfer roller 104 includes an eccentric shaft inside of the bump transfer roller 104 and a manual adjustment 114, such as a knurled knob, to rotate the eccentric shaft 133 inside of the bump transfer roller 104 to adjust the second position of the bump transfer roller 104.

In various embodiments, the first end of the placement apparatus includes a first endplate and the second end of the placement apparatus includes a second endplate. The die roller, anvil roller and the bump transfer roller extend between and are supported by the first and second endplates. The first and second endplates have a top end with an opening sized to allow the anvil roller and the die roller to be loaded into the placement apparatus. A first bridge press connects to the top of the first endplate and a second bridge press connects to the top of the second endplate. The bridge presses apply a force to press the die roller against the anvil roller. The force is manually adjustable using the first and second bridge presses.

In various embodiments, the placement apparatus includes a die roller, a anvil roller and a bump transfer roller assembly. The die roller cuts articles from a first web. The anvil roller supports the first web as articles are cut with the die roller. The anvil roller transfers the cut articles for placement on a second web. The bump transfer roller assembly includes a bump transfer roller with an eccentric shaft and a manual adjustment to rotate the eccentric shaft. The bump transfer roller assembly moves translationally between a first position and a second position.

In various embodiments, a web placement apparatus is used in a placement process for placing an article on a web. In various embodiments, the process includes providing a stream of articles, placing the articles on an anvil roller, rotating the anvil roller, moving the output web and intermittently bringing the output web in communicative association with the anvil roller to transfer the articles from the anvil roller to the output web. In various embodiments, intermittently bringing the output web in communicative association with the anvil roller includes translationally moving a bump transfer roller to intermittently bump the output web toward the anvil roller. In various embodiments, the process of placing an article on a web includes rotating an eccentric shaft of the bump roller to adjust motion of the output web relative to the anvil roller.

In various embodiments of the placement process, the articles are spaced on the output web at a predetermined distance from each other. In various embodiments of the placement process, moving the bump transfer roller to intermittently bump the output web toward the anvil roller includes using a servo motor to control motion of the bump transfer roller between a first axial position and a second axial position.

In various embodiments, the placement process includes using at least one clamp to mount a web placement module to a web processing machine, threading a first web though an input nip station, passing the first web between a die roller and an anvil roller, threading a second web between the anvil roller and a bump transfer roll mounted to a bump transfer roll assembly, cutting articles from the first web using the anvil roller and the die roller, transferring the articles to the second web using the anvil roller and placing the articles on the second web using the bump transfer roller assembly. In various embodiments, the above placement method uses a web placement apparatus that includes at least one web clamp, a die roller, an anvil roller, a bump transfer roll assembly, and an input nip station having a servo driven nip roller and an idler nip roller.

The descriptions above and the accompanying drawings should be interpreted in the illustrative and not the limited sense. While the invention has been disclosed in connection with an embodiment or embodiments thereof, it should be understood by those skilled in the art that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A method for using a placement apparatus to place articles on a web, wherein the placement apparatus includes a frame with a die roller, an anvil roller, a bump transfer roll assembly with a bump transfer roll, the method comprising:

- passing a first web between the die roller and the anvil roller of the web placement module;
- passing a second web between the anvil roller and the bump transfer roll;
- cutting the first web using the anvil roller and the die roller to provide cut articles;
- transferring the cut articles to the second web using the anvil roller; and
- placing the cut articles on the second web using the bump transfer roll assembly, a motor and mechanical linkage between the motor and the bump transfer roll which includes an eccentric shaft, wherein the mechanical linkage includes an eccentric shaft, and wherein placing articles on the second web using the bump transfer roll includes using the motor to rotate the eccentric shaft of the mechanical linkage to periodically move a bump transfer roll toward the anvil roll, and wherein placing articles on the second web using the bump transfer roll includes using a knob to manually rotate the eccentric shaft of the bump transfer roll to adjust the position of the bump transfer roll.

2. The method of claim 1, further comprising moving the first web and the second web concurrently as the first web is cut and as the cut articles are transferred to and placed on the second web, wherein moving the first web and the second web concurrently includes:

- moving the first web at a first predetermined velocity; and
- moving the second web at a second predetermined velocity.

3. The method of claim 2, wherein the first predetermined velocity is less than the second predetermined velocity.

4. The method of claim 2 wherein the first predetermined velocity is equal to the second predetermined velocity.

5. The method of claim 1, wherein cutting the first web transforms the first web into a first web matrix, and wherein the method further includes collecting the first web matrix after the first web passes between the anvil roller and the die roller.

6. The method of claim 1, comprising:

- providing a stream of the articles on the first web and moving the second web, wherein transferring the cut articles includes placing the articles on an anvil roller and rotating the anvil roller;
- as the anvil roller rotates and the second web moves, intermittently bringing the second web into communicative association with the rotating anvil roller to transfer the articles from the rotating anvil roller to the moving second web, moving the bump transfer roll translationally from a first position away from the anvil roller to a second position toward the anvil roller to intermittently bump the second web toward the anvil roller; and rotating the eccentric shaft of the bump transfer roller to adjust the second position of the translational motion.

7. The method of claim 1, wherein the articles are spaced on the second web at a predetermined distance from each other.

8. The method of claim 6, wherein the motor is a servo motor, and moving the bump transfer roll to intermittently bump the second web toward the anvil roller further includes using the servo motor to control motion of the bump transfer roll between a first axial position and a second axial position.

9. The method of claim 1, wherein the frame has at least one clamp, the method further comprising using the at least one clamp to mount the placement apparatus to a web processing machine.

10. The method of claim 1, wherein the placement apparatus includes an input nip station having a servo drive nip roller and an idler nip roller, the method comprising threading a first web through the input nip station of the placement apparatus.

* * * * *